US011665689B2

(12) United States Patent
Balasubramanian et al.

(10) Patent No.: US 11,665,689 B2
(45) Date of Patent: May 30, 2023

(54) SIGNALING APPARATUS AND METHODS FOR SUPERPOSITION TRANSMISSION OF SIDELINK AND UPLINK MESSAGES IN V2X COMMUNICATIONS

(71) Applicant: QUALCOMM Incorporated, San Diego, CA (US)

(72) Inventors: Anantharaman Balasubramanian, San Diego, CA (US); Shuanshuan Wu, San Diego, CA (US); Gabi Sarkis, San Diego, CA (US); Kapil Gulati, Hillsborough, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 16/908,446

(22) Filed: Jun. 22, 2020

(65) Prior Publication Data
US 2021/0400692 A1 Dec. 23, 2021

(51) Int. Cl.
*H04W 72/1268* (2023.01)
*H04W 76/11* (2018.01)
(Continued)

(52) U.S. Cl.
CPC ....... *H04W 72/1268* (2013.01); *H04L 1/0004* (2013.01); *H04L 61/2517* (2013.01);
(Continued)

(58) Field of Classification Search
None
See application file for complete search history.

(56) References Cited

U.S. PATENT DOCUMENTS

2018/0359749 A1* 12/2018 Liu ................ H04W 72/02
2020/0029318 A1* 1/2020 Guo ................ H04L 1/1819
(Continued)

FOREIGN PATENT DOCUMENTS

EP 3952436 * 2/2019

OTHER PUBLICATIONS

Author Unknown, Discussion on UL and SL prioritization for NR-V2X, Doc. No. R1-1910377, pp. 1-6, Oct. 14 (Year: 2019).*
(Continued)

*Primary Examiner* — Christopher M Crutchfield
(74) *Attorney, Agent, or Firm* — Loza & Loza LLP

(57) ABSTRACT

Aspects of this disclosure relate to a user equipment (UE) for wireless communication within a network. The UE receives, from a radio access network (RAN) entity, one of an uplink indication or an uplink port identification associated with an uplink port. The uplink indication and the uplink port identification are associated with an uplink message. The UE also maps one of the uplink indication to a sidelink indication associated with a sidelink message or the uplink port identification to a sidelink port identification associated with a sidelink port and the sidelink message. The UE further superposition codes the uplink message and the sidelink message into a broadcast transmission based on one of (A) the uplink indication and the sidelink indication, or (B) the uplink port and the sidelink port. In addition, the UE transmits, to the RAN entity, the broadcast transmission.

30 Claims, 15 Drawing Sheets

(51) Int. Cl.

| | |
|---|---|
| *H04W 52/24* | (2009.01) |
| *H04L 1/00* | (2006.01) |
| *H04L 61/2517* | (2022.01) |
| *H04W 72/23* | (2023.01) |
| *H04W 92/18* | (2009.01) |

(52) U.S. Cl.
CPC ......... *H04W 52/242* (2013.01); *H04W 72/23* (2023.01); *H04W 76/11* (2018.02); *H04W 92/18* (2013.01)

(56) References Cited

U.S. PATENT DOCUMENTS

| | | | |
|---|---|---|---|
| 2020/0296690 A1* | 9/2020 | Lee | H04W 72/02 |
| 2021/0051613 A1* | 2/2021 | Tang | H04W 72/0446 |
| 2021/0184909 A1* | 6/2021 | Han | H04L 27/3488 |
| 2021/0195576 A1* | 6/2021 | Balasubramanian | H04W 72/048 |
| 2021/0235461 A1* | 7/2021 | Balasubramanian | H04W 52/34 |
| 2021/0307070 A1* | 9/2021 | Kim | H04L 25/0226 |
| 2021/0345360 A1* | 11/2021 | Yeo | H04W 4/46 |
| 2021/0377963 A1* | 12/2021 | Wang | H04W 52/38 |
| 2021/0410084 A1* | 12/2021 | Li | H04W 52/265 |

OTHER PUBLICATIONS

Author Unknown, Summary of [96#59][LTE/V2X] on Uu/SL prioritization, Doc. No. R2-1701375, pp. 1-14, Feb. 17 (Year: 2017).*

Author Unknown, Power Budget Sharing Across SL and UL, Doc. No. R2-1703544, pp. 1-2, Apr. 7 (Year: 2017).*

* cited by examiner

500

| Interface | MCS Mapping | | | |
|---|---|---|---|---|
| | MCS-1 | MCS-2 | MCS-3 | MCS-4 |
| Uplink | $a_1$ | $a_2$ | $a_3$ | $a_4$ |
| Sidelink | $b_1, c_1$ | $b_2, c_2$ | $b_3, c_3$ | $b_4, c_4$ |

FIG. 5

SIGNALING APPARATUS AND METHODS FOR SUPERPOSITION TRANSMISSION OF SIDELINK AND UPLINK MESSAGES IN V2X COMMUNICATIONS

TECHNICAL FIELD

The technology discussed herein relates generally to wireless communication systems, and more particularly, to a method and apparatus for the superposition transmission of sidelink and uplink messages with the sidelink message as a base layer for mode-1 vehicle-to-everything (V2X) communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE). In some wireless communications systems, a UE may transmit and receive messages within a vehicle-to-everything (V2X) sidelink network. For example, a UE may utilize both sidelink communications with another UE and uplink communications with a base station. In Rel-16, for Mode-1 V2X systems, separate resources may be assigned for transmitting sidelink messages and uplink messages.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some embodiments, a method of wireless communication at a user equipment (UE) is provided. The method includes receiving, from a radio access network (RAN) entity, one of an uplink indication or an uplink port identification associated with an uplink port. The uplink indication and the uplink port identification are associated with an uplink message. The method also includes mapping one of the uplink indication to a sidelink indication associated with a sidelink message or the uplink port identification to a sidelink port identification associated with a sidelink port and the sidelink message. The method further includes superposition coding the uplink message and the sidelink message into a broadcast transmission based on one of (A) the uplink indication and the sidelink indication, or (B) the uplink port and the sidelink port. In addition, the method includes transmitting, to the RAN entity, the broadcast transmission.

In certain embodiments, the uplink indication comprises one of (A) an uplink modulation index, or (B) one or more downlink control information messages for scheduling at least one of the uplink message or the sidelink message.

In some embodiments, a user equipment (UE) for wireless communication is provided. The UE includes a transceiver for wirelessly communicating with a radio access network (RAN) entity. The UE also includes one or more processors electronically coupled to the transceiver. The one or more processor are configured to receive, from a radio access network (RAN) entity, one of an uplink indication or an uplink port identification associated with an uplink port. The uplink indication and the uplink port identification are associated with an uplink message. The one or more processors are also configured to map one of the uplink indication to a sidelink indication associated with a sidelink message or the uplink port identification to a sidelink port identification associated with a sidelink port and the sidelink message. The one or more processors are also configured to superposition code the uplink message and the sidelink message into a broadcast transmission based on one of (A) the uplink indication and the sidelink indication, or (B) the uplink port and the sidelink port. In addition, the one or more processors are configured to transmit, to the RAN entity, the broadcast transmission.

In certain embodiments, the uplink indication comprises one of (A) an uplink modulation index, or (B) one or more downlink control information messages for scheduling at least one of the uplink message or the sidelink message.

In some embodiments, a method of wireless communication at a radio access network (RAN) entity is provided. The method includes transmitting, to a user equipment (UE), one of an uplink indication or an uplink port identification associated with an uplink port. The uplink indication and the uplink port identification are associated with an uplink message. The method also includes receiving, from the UE, a broadcast transmission comprising a sidelink message, the uplink message, and sidelink control information associated with the sidelink message. The sidelink message and the uplink message are contained in the broadcast transmission using superposition coding. The method further includes identifying one of a sidelink indication or a sidelink port identification by decoding the sidelink control information. The sidelink indication and the sidelink port identification are associated with the sidelink message. The sidelink indication is mapped to the uplink indication and the sidelink port identification is mapped to the uplink port identification. In addition, the method includes decoding the uplink message based on (A) decoding the sidelink message using the sidelink modulation index, and (B) mapping one of the sidelink indication to the uplink indication or the sidelink port identification to the uplink port identification.

In certain embodiments, the uplink indication comprises one of (A) an uplink modulation index, or (B) one or more downlink control information messages for scheduling at least one of the uplink message or the sidelink message.

In some embodiments, a radio access network (RAN) entity for wireless communication is provided. The RAN entity includes a transceiver for wirelessly communicating with a user equipment (UE). The RAN entity also includes one or more processors electronically coupled to the transceiver. The one or more processor are configured to transmit, to the UE, one of an uplink indication or an uplink port identification associated with an uplink port. The uplink indication and the uplink port identification are associated with an uplink message. The one or more processor are also configured to receive, from the UE, a broadcast transmission comprising a sidelink message, the uplink message, and sidelink control information associated with the sidelink message. The sidelink message and the uplink message are contained in the broadcast transmission using superposition coding. The one or more processor are further configured to identify one of a sidelink indication or a sidelink port identification by decoding the sidelink control information. The sidelink indication and the sidelink port identification are associated with the sidelink message. The sidelink indication is mapped to the uplink indication and the sidelink port identification is mapped to the uplink port identification. In addition, the one or more processor are configured to decode the uplink message based on (A) decoding the sidelink message using the sidelink modulation index, and (B) mapping one of the sidelink indication to the uplink indication or the sidelink port identification to the uplink port identification.

These and other aspects of the disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures herein, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed herein as device, system, or method embodiments it should be understood that such exemplary embodiments can be implemented in various devices, systems, and methods.

BRIEF DESCRIPTION OF THE DRAWINGS

FIG. 5 is an example table of modulation and control scheme (MCS) ranges that map uplink modulation indices to one or more sidelink modulation indices.

DETAILED DESCRIPTION

Figure 1:
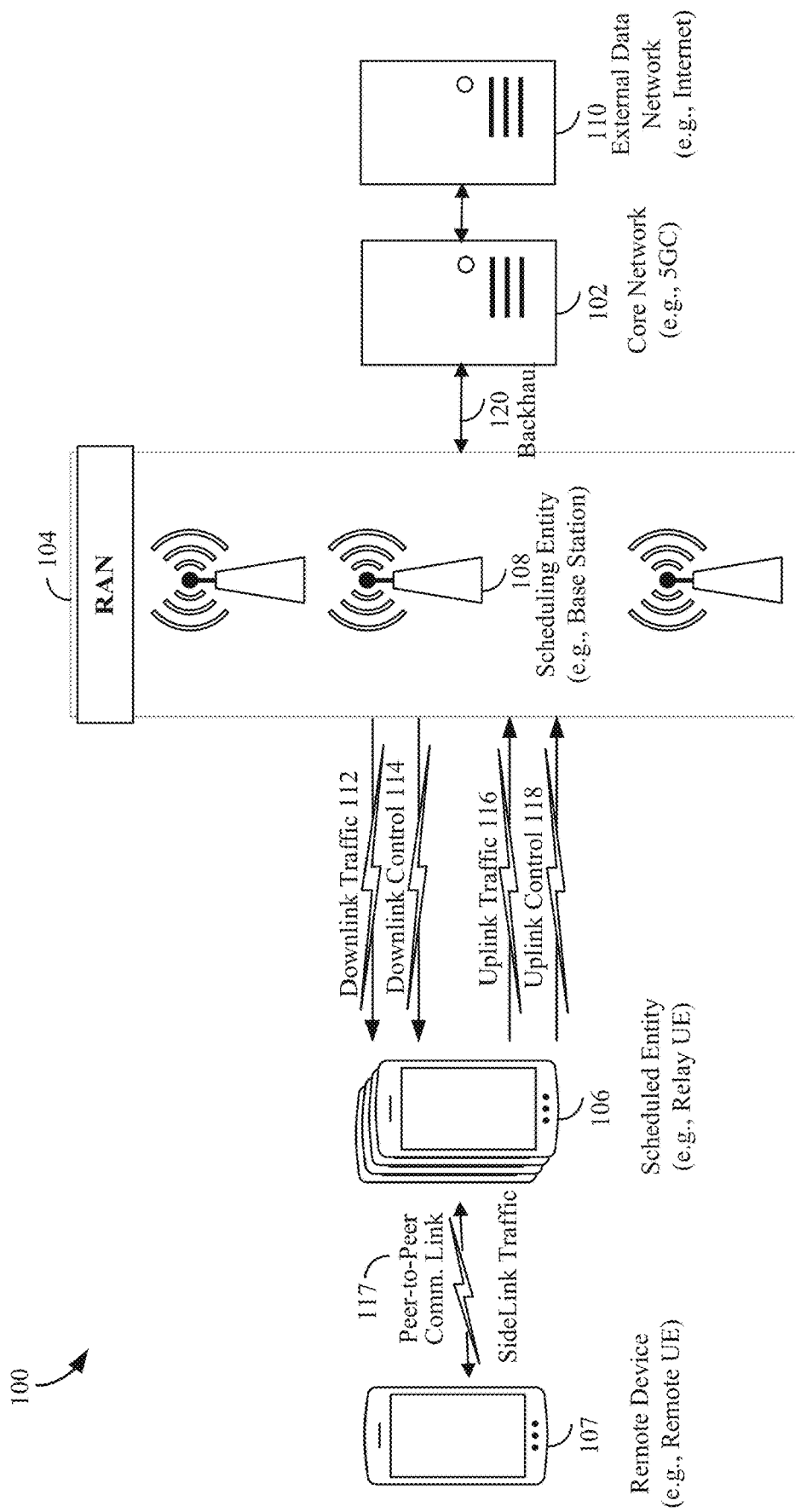
FIG. 1 is a schematic illustration of a wireless communication system.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some wireless communications systems, such as a fifth generation (5G) new radio (NR) wireless network, one or more wireless devices may communicate directly with each other using sidelink communications and, thus, without transmitting via a base station. The wireless devices may also communicate with one or more base stations using uplink communications. For example, vehicles and other wireless devices (e.g., user equipment (UEs), sensors, etc.) may communicate with each other in a vehicle-to-everything (V2X) communication network to exchange information (e.g., for autonomous vehicle operations). At the same time, those same vehicles and other wireless devices may communicate with one or more base stations to exchange information.

In Rel-16 Mode-1 V2X systems where a base station controls both uplink communications and sidelink communications, separate resources may be assigned for transmitting sidelink messages and uplink messages. However, when there is a relatively high signal-to-noise ratio (SNR) between an uplink communication channel and a sidelink communication channel, a same resource may be used to concurrently transmit an uplink message and a sidelink message using superposition coding through a broadcast transmission. For example, a user equipment may want to transmit a sidelink message to other user equipment and an uplink message to a base station. The user equipment may utilize a superposition transmission and encode the base layer or the coarse layer on the weaker link and an enhancement layer or fine layer on the stronger link Because both the base station and the user equipment understand both the coarse layer and the fine layer while only the base station understands the fine layer, the user equipment may receive only the sidelink message, while the base station may receive both the sidelink message and the uplink message. Upon receiving both the sidelink message and the uplink message, the base station may discard or ignore the sidelink message and utilize the uplink message. Accordingly, the user equipment may concurrently transmit both the sidelink message to the other user equipment and the uplink message to the base station using a single superposition transmission.

Various aspects of the present disclosure relate to superposition coding an uplink message and a sidelink message into a single broadcast transmission for reception by a base station and another UE, respectively. According to some aspects, a user equipment (UE) receives, from a radio access network (RAN) entity, an uplink modulation index associated with an uplink message. The uplink modulation index is based on a sidelink path loss of a sidelink communication channel of the UE and an uplink path loss of an uplink communication channel for communication between the UE and the RAN entity. The UE maps the uplink modulation index to one or more sidelink modulation indices associated with a sidelink message. The UE superposition codes the uplink message and the sidelink message into a broadcast transmission based on the uplink modulation index and a selected sidelink modulation index of the one or more sidelink modulation indices. The UE transmits, to the RAN entity, the broadcast transmission and sidelink control information associated with the sidelink message for enabling the RAN entity to decode the uplink message.

Particular aspects of the disclosed techniques enable a UE to transmit both an uplink message and a sidelink message in a single broadcast transmission using superposition coding so that a base station receives the uplink message and another UE receives the sidelink message.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and user equipment (UE) 106 and 107. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of service data, or relevant QoS for transport of service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In some implementations, the scheduled entity 106 may establish a peer-to-peer communication link 117 with a remote device 107 (e.g., remote UE). The remote device 107 may then use the peer-to-peer communication link 117 to establish a communication session with the RAN 104. In such configuration, the scheduled entity 106 may serve as a relaying UE to facilitate communications between the remote device 107 and the RAN 104.

Figure 2:
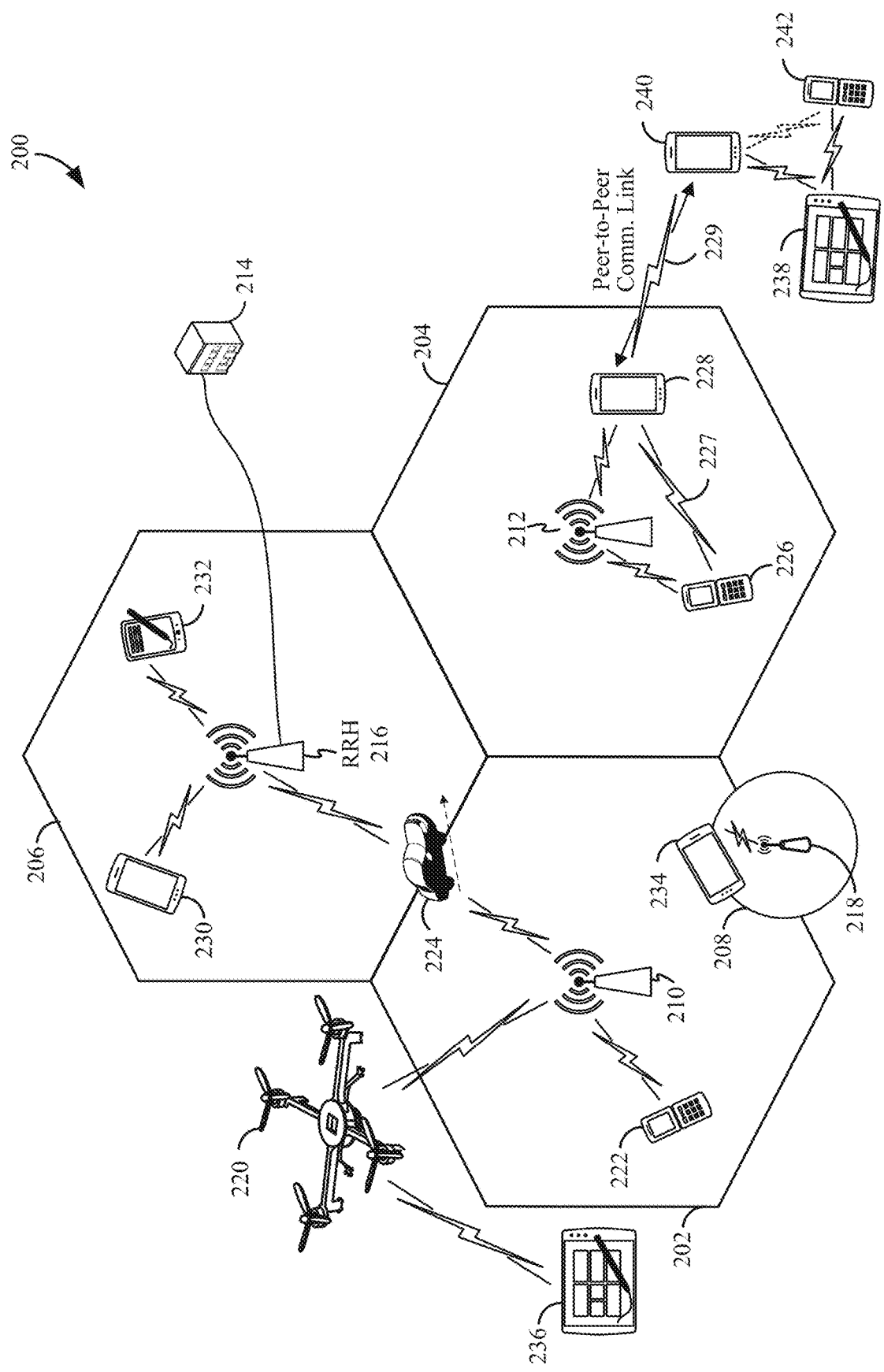
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, or 242 may be the same as the UE/scheduled entity 106 or remote device 107 described herein and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, part of the core network 102 in FIG. 1), which may include a security context management function (SCMF) that manages the security context for both the control plane and the user plane functionality, and a security anchor function (SEAF) that performs authentication.

According to one aspect, some UEs may establish peer to peer communication links 227 and 229. For instance, remote UEs 226, 240 and 238 and relay UEs 228 may establish such peer to peer communication links, which may then enable the remote UEs to establish communication sessions with the mobile network (e.g., base stations 210, 212, and 214) through the relay UEs. While the remote UEs and relay UEs may negotiate and establish the peer to peer communication links 227 and 229 on their own, the mobile network may provide or contribute information to secure communications over the peer to peer communication link. In other implementations, the peer to peer communication links 227 and 229 may be secured by a pre-shared key known to the remote UE and the relay UE.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency or with the same timing. The use of zones in 5G networks or other next generation communication networks enables the uplink-based mobility framework and improves the efficiency of both the UE and the network, since the number of mobility messages for exchange between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules may still generally be used to access unlicensed spectrum, generally, any operator or device may gain access. Shared spectrum may fall between licensed and unlicensed spectrum, wherein technical rules or limitations may be used to access the spectrum, but the spectrum may still be shared by multiple operators or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can transmit information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

As referred to within the present disclosure, a frame may refer to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an example downlink subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 may correspond in whole to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE. In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 millisecond (ms) subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., the PDCCH), and the data region 314 may carry data channels (e.g., PDCCH or PUSCH). Of course, a slot may contain all DL, all UL, or at least one DL portion and at least one UL portion. The structure illustrated in FIG. 3 is merely example in nature, and different slot structures may be utilized, and may include one or more of each of the control region(s) and data region(s).

Figure 3:
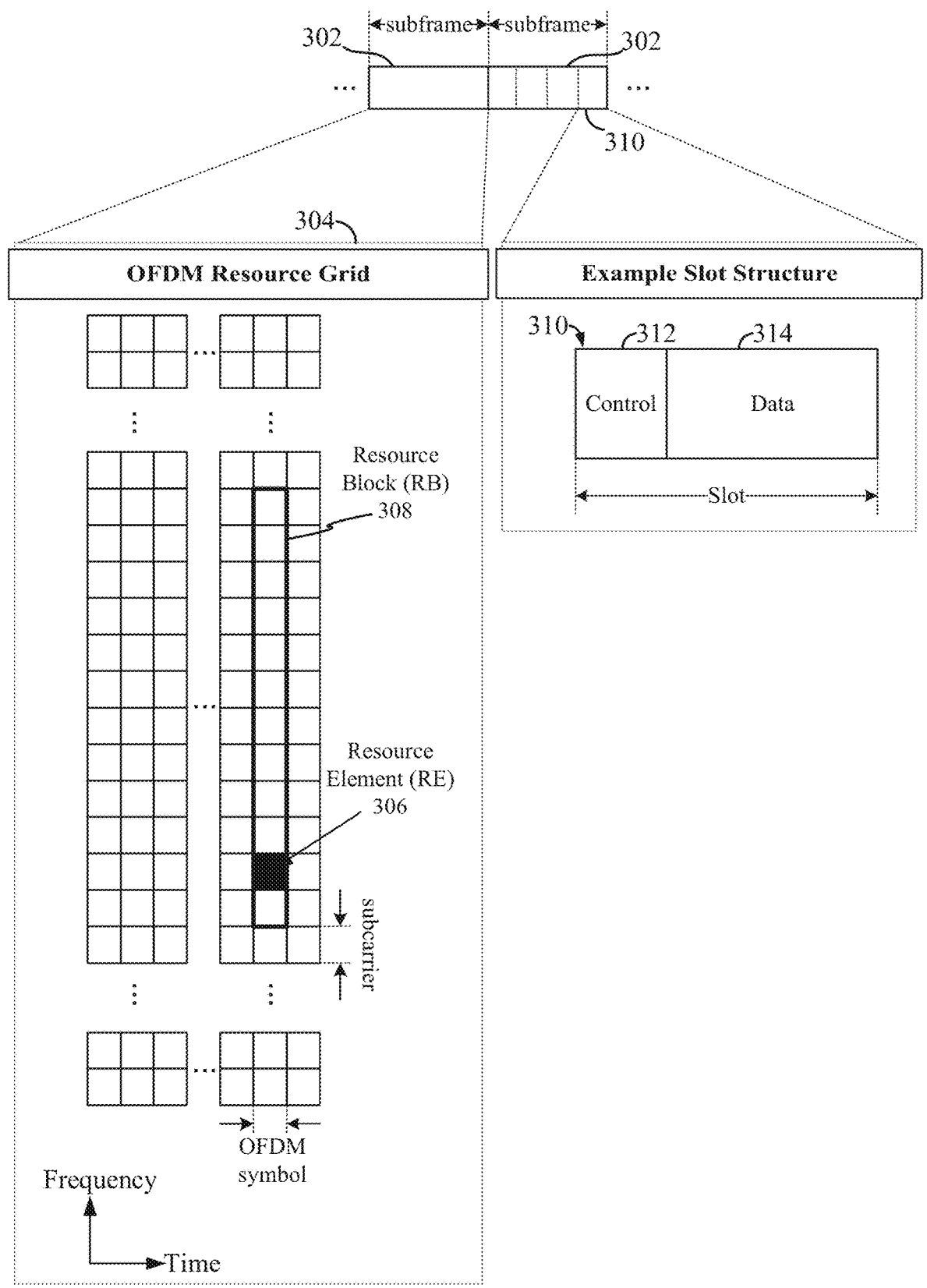
FIG. 3 illustrates an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, or an assignment of REs for DL and UL transmissions. The PHICH carries HARQ feedback transmissions such as an acknowledgment (ACK) or negative-acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may transmit a HARQ retransmission, which may implement chase combining, incremental redundancy, etc.

In an UL transmission, the transmitting device (e.g., the scheduled entity 106) may utilize one or more REs 206 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In Rel-16 Mode-1 V2X systems where a base station controls both uplink communications and sidelink communications, separate resources may be assigned for transmitting sidelink messages and uplink messages. However, when there is a relatively high signal-to-noise ratio (SNR) mismatch between an uplink communication channel and a sidelink communication channel, a same resource may be used to concurrently transmit an uplink message and a sidelink message using superposition coding through a broadcast transmission. For example, a user equipment may want to transmit a sidelink message to other user equipment and an uplink message to a base station. The user equipment may utilize a superposition transmission and encode the base layer or the coarse layer on the weaker link and an enhancement layer or fine layer on the stronger link Because both the base station and the user equipment understand the coarse layer while only the base station understands the fine layer, the user equipment may receive only the sidelink message, while the base station may receive both the sidelink message and the uplink message. Upon receiving both the sidelink message and the uplink message, the base station may discard or ignore the sidelink message and utilize the uplink message. Accordingly, the user equipment may concurrently transmit both the sidelink message to the other user equipment and the uplink message to the base station using a single superposition transmission.

When a UE uses superposition coding to concurrently transmit an uplink message and a sidelink message in a single broadcast transmission, a variety of signaling protocols may be used. For example, the base station may receive and decode an uplink message and a sidelink message which have been superposition coded together into a single broadcast transmission. However, after receiving and decoding the uplink message and the sidelink message, the base station may discard or ignore the sidelink message while utilizing the uplink message for subsequent processing. Another UE in communication with the UE via the sidelink may receive the uplink message and the sidelink message in the same superposition broadcast transmission. After receiving the sidelink message, the other UE may decode the sidelink message for subsequent processing. However, after receiving the uplink message, the other UE may be unable to understand and decode the uplink message, and thus, may be unable to use the uplink message for subsequent processing. As described herein, the signaling protocols include the use of modulation indices, one or more downlink control information messages, and/or port indicators.

Figure 4:
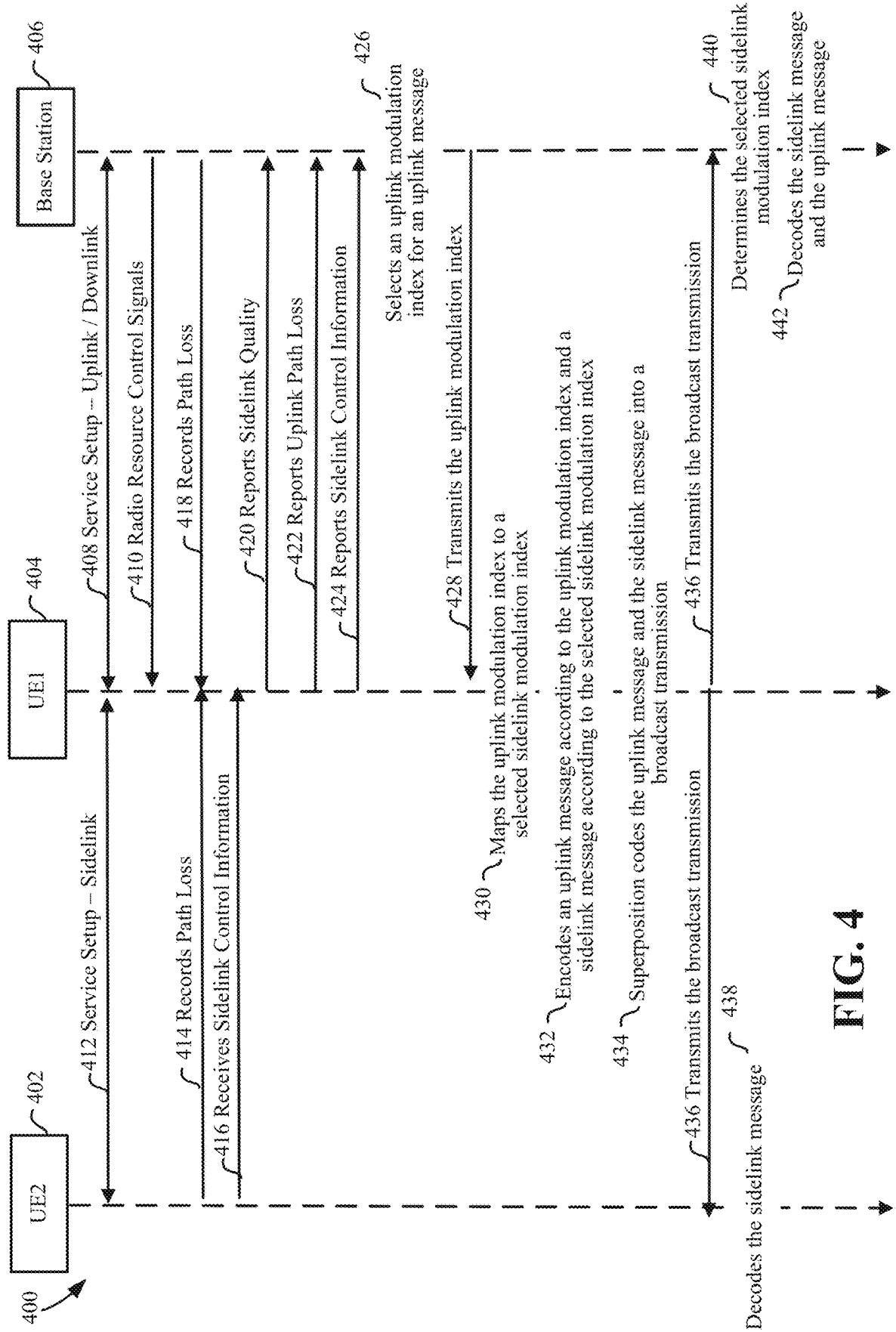
FIG. 4 is a conceptual illustration of an example wireless communication system for superposition coding and transmission of a sidelink message and an uplink message.

FIG. 4 is a conceptual illustration of an example wireless communication system 400 for superposition coding and transmission of a sidelink message and an uplink message. The wireless communication system may implement superposition coding and transmission of a sidelink message and an uplink message using modulation indices. Wireless communication services may be set up 408 between a first UE (UE1) 404 and a base station 406. For instance, such communication services may be compatible with a 5G wireless communication protocol. The communication channels providing wireless communication between the first UE 404 and the base station 406 may include uplink channels and downlink channels.

In certain embodiments, during or after the setup 408 between the first UE 404 and the base station 406, the first UE 404 may receive radio resource control (RRC) broadcast signals broadcast from the base station 406. The radio resource control broadcast signals may include one or more modulation indices for uplink communications and a correlated (e.g., mapped) one or more modulation indices for sidelink communications. For example, during or after the setup 408 between the first UE 404 and the base station 406, the base station 406 may transmit (e.g., broadcast) a radio resource control signal to the first UE 404. The radio resource control signal may include a modulation index for an uplink communication and a corresponding (e.g., a mapped) modulation index for a sidelink communication. As described herein, because the base station 406 knows the one or more uplink modulation indices and the corresponding one or more sidelink modulation indices (having sent them to the first UE 404), when the base station 406 receives a broadcast transmission from the first UE 404 containing an uplink message superposition coded with a sidelink message using the uplink modulation index and a sidelink message encoded using the sidelink modulation index, the base station 406 may decode the sidelink message (which may be ignored or disregarded by the base station 406) using the sidelink modulation index and may decode the uplink message using the corresponding uplink modulation index. It should be understood that in some cases, the uplink modulation index and the corresponding sidelink modulation index may be a same modulation index. Conversely, the uplink modulation index and the corresponding sidelink modulation index may be different indices.

In some embodiments, the radio resource control signals may include minimum and/or maximum modulation and control scheme (MCS) range for uplink and sidelink transmissions and mapping information for mapping a plurality of uplink modulation indices to one or more different sidelink modulation indices. FIG. 5 is an example table 500 of modulation and control scheme (MCS) ranges that map a plurality of uplink modulation indices to one or more different sidelink modulation indices. The table 500 may be the same as or at least similar to Table 7.1.7.1-1 from 3GPP TS 36.213. As shown in FIG. 5, the table 500 includes a plurality of modulation and control schemes (e.g., MCS-1, MCS-2, MCS-3, MCS-4, etc.) that maps uplink modulation indices ($a_1$, $a_2$, $a_3$, $a_4$, etc.) to one or more different sidelink modulation indices (($b_1$, $c_1$), ($b_2$, $c_2$), ($b_3$, $c_3$), ($b_4$, $c_4$), etc.). For example, for MCS-1, the mapping information may map uplink modulation index $a_1$ to sidelink modulation indices $b_1$ and $c_1$; for MCS-2, the mapping information may map uplink modulation index $a_2$ to sidelink modulation indices $b_2$ and $c_2$; for MCS-3, the mapping information may map uplink modulation index $a_3$ to sidelink modulation indices $b_3$ and $c_3$; and for MCS-4, the mapping information maps uplink modulation index $a_4$ to sidelink modulation indices $b_4$ and $c_4$. As discussed herein, when the base station 406 directs (e.g., through a downlink control information (DCI) transmission) the first UE 404 to use a particular uplink modulation index (e.g., a minimum and/or maximum modulation and control scheme range) for an uplink message, for example, based on a reported path loss of a sidelink communication channel and the uplink communication channel, the first UE 404 may refer to the mapping information provided in the table 500 to select a sidelink modulation index that correlates with the particular uplink modulation index for a sidelink message.

Returning back to FIG. 4, wireless communication services may also be setup 412 between the first UE 404 and a second UE (UE2) 402. For instance, such communication services may be compatible with Evolved Universal Terrestrial Radio Access Network (eUTRAN) wireless communication protocols, often referred to as Long-Term Evolution (LTE). The communication channels providing wireless communication between the first UE 404 and the second UE 402 may include sidelink channels.

After the respective services are set up, the first UE 404 may wish to send an uplink message to the base station 406 and a sidelink message to the second UE 402. The first UE 404 may record a path loss 414 experienced over a sidelink communication channel between the first UE 404 and the second UE 402. The first UE 404 may use the recorded path loss experienced over the sidelink communication channel between the first UE 404 and the second UE 402 to report a sidelink quality to the base station 406.

In certain embodiments, the first UE 404 may record and calculate an average path loss experienced over the sidelink communication channel between the first UE 404 and the second UE 402 over a specified time frame ($T_w$). For example, the first UE 404 may determine a reference signal received power (RSRP) or a reference signal received quality (RSRQ) of a sidelink communication channel between the first UE 404 and the second UE 402. The reference signal received power may be power of the reference signals spread over the full bandwidth and a narrow band. Similarly, the reference signal received quality may be the quality of the reference signal spread over the full bandwidth and a narrow band. The first UE 404 may also receive sidelink control information (SCI) 416, for example, carried by a Physical Sidelink Control Channel (PSCCH), from and decoded by one or more nearby UEs including the second UE 402. In some examples, the first UE 404 may also record a path loss 418 experienced over an uplink communication channel between the first UE 404 and the base station 406.

After recording the path loss 414 experienced over the sidelink communication channel and after receiving the sidelink control information (SCI) 416 from the second UE 402, the first UE 404 may report to the base station 406 the sidelink quality 420 of the sidelink communication channel between the first UE 404 and the second UE 402. The sidelink quality may be determined using the path loss (e.g., an average path loss over a period of time (Tw)) recorded by the first UE 404 over the sidelink communication channel between the first UE 404 and the second UE 402. Concurrently (such as through the same transmission used for reporting sidelink quality), or subsequently (such as through another transmission), the first UE 404 may report to the base station 406 the uplink path loss 422 of the uplink communication channel between the first UE 404 and the base station 406. The first UE 404 may also report to the base station 406 the sidelink control information 424 received from the second UE 402.

After (e.g., in response to) receiving the sidelink quality report, the uplink path loss report, and, the sidelink control information report from the first UE 404, the base station 406 may select 426 an uplink modulation index for receiving an uplink message from the first UE 404. For example, the base station 406 may select an uplink modulation index for receiving an uplink message from the first UE 404 based on at least one of the sidelink quality report or the uplink path loss report. The uplink modulation index may be an uplink modulation index previously provided to the first UE 404 (for example, through an RRC signal previously sent the first UE 404) along with a correlating (e.g., mapped) sidelink modulation indices so that the first UE 404 and the base station 406 know and use the same uplink modulation index and an identifiable correlating (e.g., mapped) sidelink modulation index for an uplink message and a sidelink message, respectively.

After the base station 406 selects an uplink modulation index, the base station 406 may transmit 428 to the first UE 404 the selected uplink modulation index. In some embodiments, when the base station 406 transmits the selected uplink modulation index, the base station 406 may also transmit updated mapping information for dynamic uplink modulation index and sidelink modulation index mapping. Otherwise, the first UE 404 may utilize mapping information previously received from the base station 406 (e.g., during a previously provided RRC transmission). The selected one or more uplink modulation indices may be transmitted to the first UE 404 through a downlink control information (DCI) transmission.

After the first UE 404 receives an uplink modulation index from the base station 406, the first UE 404 may map the received uplink modulation index to a sidelink modulation index and select that sidelink modulation index 430 for encoding of a sidelink message based on the mapping. For example, the base station 406 may have previously provided mapping information that maps a received uplink modulation index to one or more specific sidelink modulation indices. As such, the first UE 404, upon receiving an uplink modulation index from the base station 406, may map the received uplink modulation index to the one or more particular sidelink modulation indices and select one sidelink modulation indices from the one or more particular sidelink modulation index based on the mapping. As another example, the base station 406 may provide with the transmission of the uplink modulation index or may have previously provided mapping information that maps each of a plurality of uplink modulation indices to one or more sidelink modulation indices as shown in Table 500 of FIG. 5. The first UE 404, upon receiving an uplink modulation index from the base station 406, may map the received uplink modulation index to the one or more particular sidelink modulation indices indicated in the Table 500 and select one sidelink modulation indices from the one or more particular sidelink modulation index based on the mapping.

The first UE 404 may encode the uplink message according to the received uplink modulation index and may encode the sidelink message according to the selected sidelink modulation index 432. The first UE 404 may superposition code 434 the encoded uplink message and the encode sidelink message into a transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission.

The first UE 404 may transmit the broadcast transmission 436 including the uplink message superposition coded with the sidelink message so that both the base station 406 and the second UE 402 receive the broadcast transmission and both messages. Subsequently, the second UE 402 may receive the broadcast transmission and may decode the encoded sidelink message 438 using, for example, the sidelink control information previously provided 416 from the second UE 402 to the first UE 404. In an embodiment, the second UE 402 may be unable to decode the uplink message because the second UE 402 may not have the uplink modulation index provided by the base station 406 and used to decode the uplink message.

As mentioned herein, the base station 406 may receive the broadcast transmission including the uplink message superposition coded with the sidelink message. The base station 406 may decode the previously received sidelink control information to determine which of the sidelink modulation indices were used to encode the sidelink message 440. For example, the base station 406 may have previously indicated that MCS-2 from the Table 500 of FIG. 5, and the uplink modulation index $a_2$ be used by the first UE 404 for encoding the uplink message. MCS-2 may map the uplink modulation index $a_2$ to both sidelink modulation indices $b_2$ and $c_2$. The first UE 404 may have selected sidelink modulation index $b_2$ of $b_2$ and $c_2$ as the sidelink modulation index used for encoding the sidelink message. Subsequently, the base station 406 may decode the sidelink control information received from the first UE 404 to determine that $b_2$ of $b_2$ and $c_2$ is used to encode the sidelink message 442. Once the base station 406 decodes the sidelink message from the broadcast transmission, the base station 406 may decode the uplink message from the broadcast transmission using the uplink modulation index $a_2$ mapped to $b_2$ 442. In some embodiments, the base station 406 may disregard the sidelink message after decoding it.

It should be understood that the system 400 including the second UE 402, the first UE 404, and the base station 406 may implement any one or more procedures described herein in addition to the procedure described herein with respect to FIG. 4. For example, in addition to the system 400 implementing the one or more procedures described herein with respect to FIG. 4, the system 400 including the second UE 402, the first UE 404, and the base station 406 may implement any one or more procedures described herein with respect to any one or more of FIGS. 6, 7, 9, 10, 11, 13, 14, and 15. In certain embodiments, an uplink modulation index may be a type of uplink indication and a sidelink modulation index may be a type of sidelink indication. As discussed herein, in certain embodiments, a downlink control information message may also be a type of uplink indication and/or a type of sidelink indication.

Figure 6:
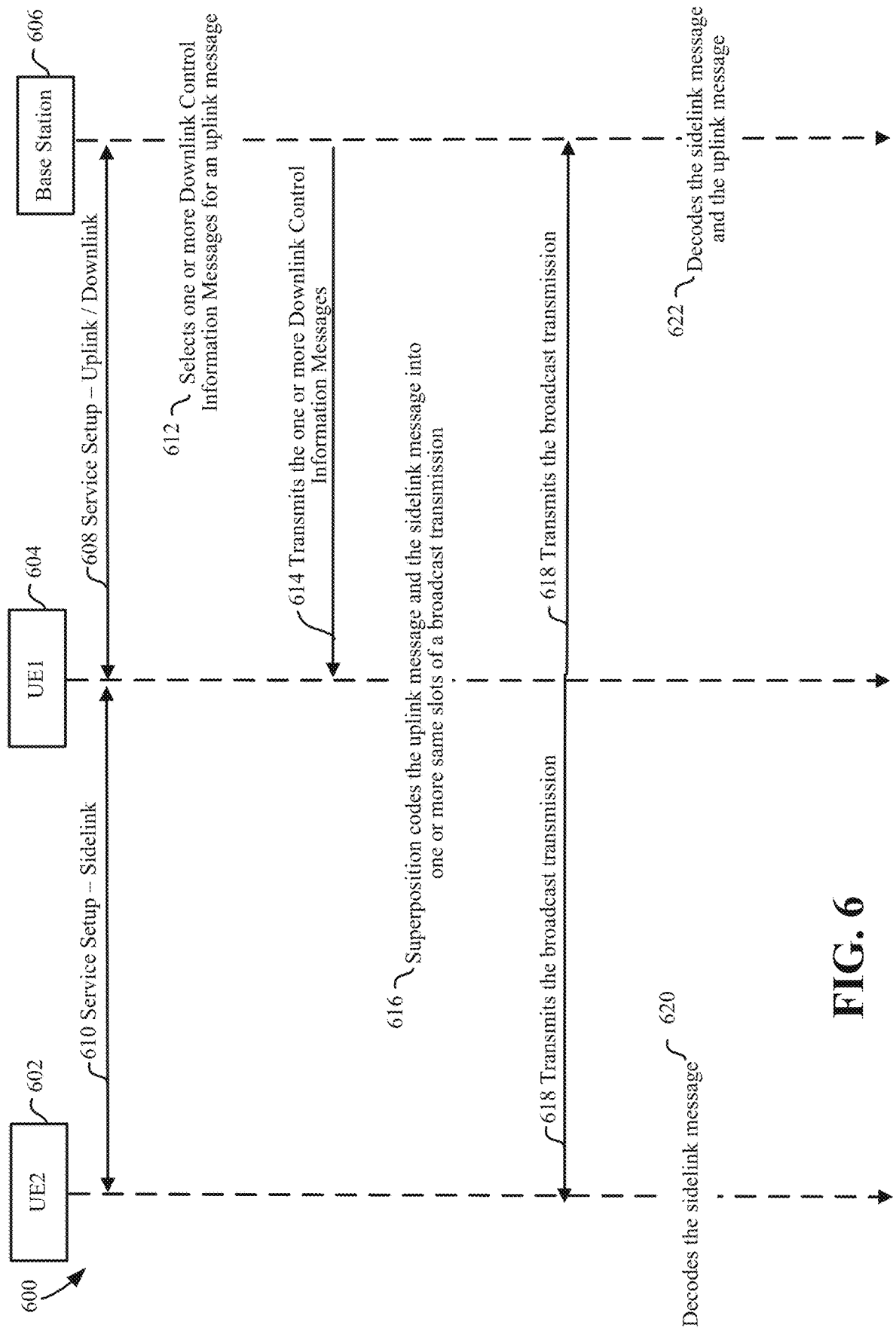
FIG. 6 is another conceptual illustration of an example wireless communication system for superposition coding and transmission of a sidelink message and an uplink message.

FIG. 6 is a conceptual illustration of an example wireless communication system 600 for superposition coding and transmission of a sidelink message and an uplink message. The wireless communication system 600 may implement superposition coding and transmission of a sidelink message and an uplink message using downlink control information messages. Wireless communication services may be set up 608 between a first UE (UE1) 604 and a base station 606. For instance, such communication services may be compatible with a 5G wireless communication protocol. The communication channels providing wireless communication between the first UE 604 and the base station 606 may include uplink channels and downlink channels. Wireless communication services may also be setup 510 between the first UE 604 and a second UE (UE2) 602. For instance, such communication services may be compatible with Evolved Universal Terrestrial Radio Access Network (eUTRAN) wireless communication protocols, often referred to as Long-Term Evolution (LTE). The communication channels providing wireless communication between the first UE 604 and the second UE 602 may include sidelink channels.

After the respective services are set up, the first UE 604 may wish to send an uplink message to the base station 606 and a sidelink message to the second UE 602. The base station 606 may select 612 one or more downlink control information (DCI) messages for receiving an uplink message from the first UE 604. In certain embodiments, the system 600 may implement one or more of procedure steps 410, 414, 416, 418, 420, 422, and 424 described herein with respect at least to FIG. 4 or one or more of procedure steps 710, 714, 716, 718, 720, 722, and 724 before the base station 606 selects one or more downlink control information messages. As such, the base station 606 may select one or more downlink control information messages for receiving an uplink message from the first UE 604, for example, based on at least one of a received sidelink quality report or a received uplink path loss report.

The base station 606 may transmit 614 one or more downlink control information (DCI) messages to the first UE 604. In Release 14 and 16, a base station may send two downlink control information messages: a first downlink control information message for scheduling an uplink message and a second downlink control information message for scheduling a sidelink message. Both the first and second downlink control information messages follow a same timeline to ensure that the uplink message and the sidelink message and transmitted in different slots. For example, when the first and second downlink control information message are transmitted in slot n within the same time, the first downlink control information message will schedule the uplink message for transmission in slot (n+$T_1$) and the second downlink control information message will schedule the sidelink message for transmission in slot (n+$T_2$) where $T_1$ and $T_2$ are different times so that the uplink message and the sidelink message are transmitted in different slots on the same time line.

In certain embodiments, the base station 606 may transmit only one downlink control information message to the first UE 604. The solitary or single downlink control information message may be used for scheduling both the uplink message and the sidelink message. For example, when the solitary downlink control information message is transmitted in slot n, both the uplink message and the sidelink message may be scheduled for transmission in slot (n+T).

After the first UE 604 receives the solitary downlink control information message from the base station 606, the first UE 604 may superposition code 616 an uplink message with a sidelink message into a broadcast transmission for concurrent transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission. Because the solitary downlink control information message schedules both the uplink message and the sidelink message for transmission in slot (n+T), the first UE 604 superposition codes the uplink message and the sidelink message in a same slot (n+T) or an overlapping slot (e.g., such that one slot is a subset of the other).

In certain embodiments, the base station 606 may transmit two different downlink control information messages to the first UE 604: a first downlink control information message for scheduling the uplink message and a second downlink control information message for scheduling the sidelink message. In this case, the first downlink control information and the second downlink control information message are on different timelines. For example, the timeline for an uplink transmission may be four slots after the first UE 604 receives the first downlink control information and the timeline for a sidelink transmission may be five slots after the first UE 604 receives the second downlink control information. Thus, when the first UE 604 receives the first downlink control information in slot (n+1), the uplink transmission of the uplink message may be scheduled for slot (n+5). When the first UE 604 receives the second downlink control information in slot n, the sidelink transmission of the sidelink message may be scheduled for the same slot as the uplink message, slot (n+5).

After the first UE 604 receives the two different downlink control information messages from the base station 606, the first UE 604 may superposition code 616 an uplink message with a sidelink message for concurrent transmission in slot (n+5). Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission. Because both downlink control information message schedule both the uplink message and the sidelink message for transmission in slot (n+5), the first UE 604 superposition codes the uplink message with the sidelink message in the same slot (n+5) or an overlapping slot (e.g., such that one slot is a subset of the other).

The first UE 604 may transmit the broadcast transmission 618 including the uplink message superposition coded with the sidelink message so that both the base station 606 and the second UE 602 receive the broadcast transmission and both messages. Subsequently, the second UE 602 may receive the broadcast transmission and may decode the encoded sidelink message 620. In an embodiment, the second UE 602 may be unable to decode the uplink message because the second UE 602 may not have the timing provided by the base station 606 for the uplink message.

As mentioned herein, the base station 606 may receive the broadcast transmission including the uplink message superposition coded with the sidelink message. The base station 606 may decode the sidelink message and the uplink message from the broadcast transmission 622. For example, after decoding the sidelink message, the base station 606 may disregard the sidelink message. After disregarding the sidelink message, the base station 606 may decode the uplink message from the broadcast transmission based on the timing provided by the base station 606 for the uplink message.

It should be understood that the system 600 including the second UE 602, the first UE 604, and the base station 606 may implement any one or more procedures described herein in addition to the procedure described herein with respect to FIG. 6. For example, in addition to the system 600 implementing the one or more procedures described herein with respect to FIG. 6, the system 600 including the second UE 602, the first UE 604, and the base station 606 may implement any one or more procedures described herein with respect to any one or more of FIGS. 4, 7, 9, 10, 11, 13, 14, and 15. In certain embodiments, a downlink control information message may be a type of uplink indication and/or a type of sidelink indication. As discussed herein, in certain embodiments, an uplink modulation index may also be a type of uplink indication and a sidelink modulation index may also be a type of sidelink indication.

Figure 7:
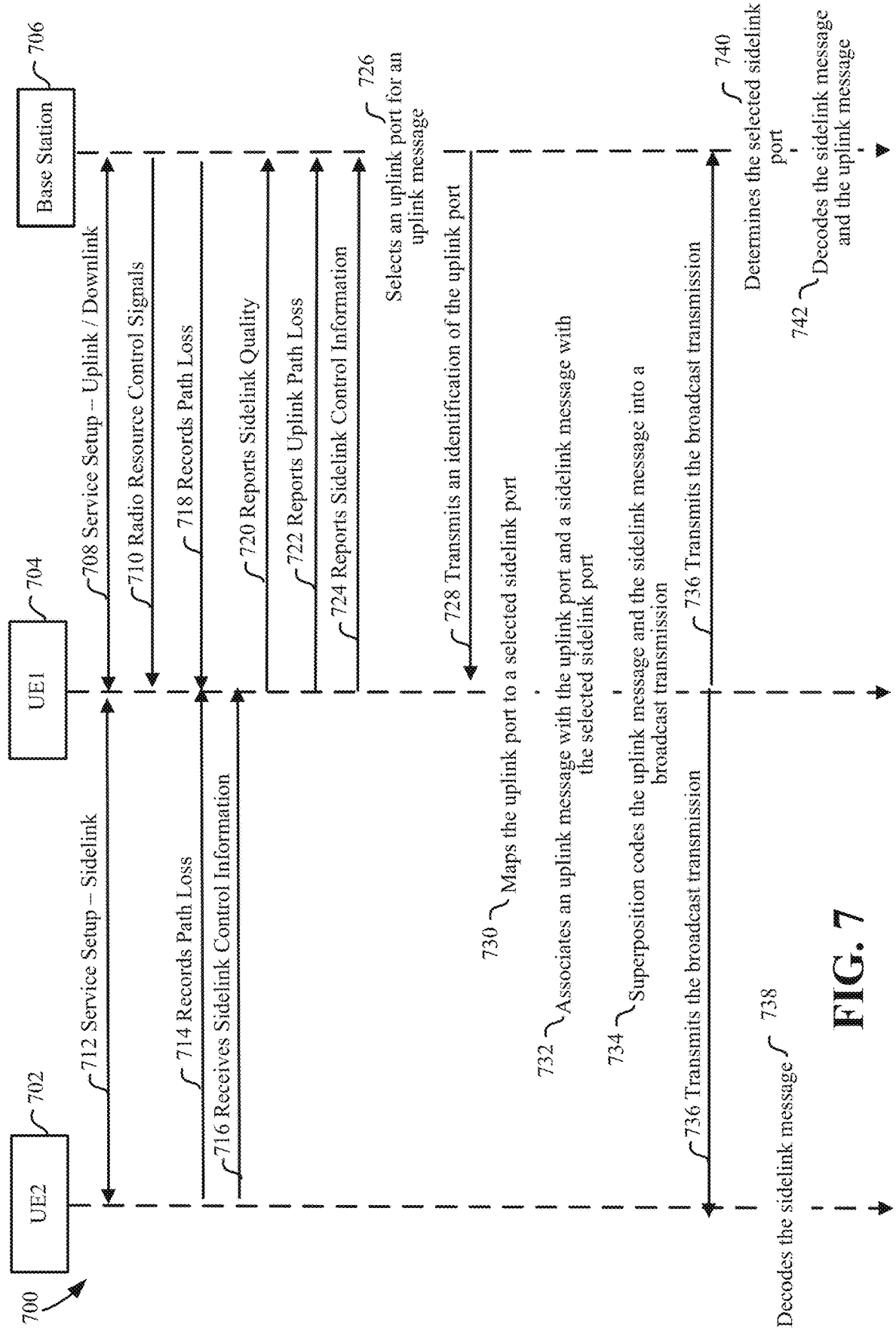
FIG. 7 is yet another conceptual illustration of an example wireless communication system for superposition coding and transmission of a sidelink message and an uplink message.

FIG. 7 is a conceptual illustration of an example wireless communication system 700 for superposition coding and transmission of a sidelink message and an uplink message. The wireless communication system 700 may implement superposition coding and transmission of a sidelink message and an uplink message using uplink and sidelink port indications. Wireless communication services may be set up 708 between a first UE (UE1) 704 and a base station 706. For instance, such communication services may be compatible with a 5G wireless communication protocol. The communication channels providing wireless communication between the first UE 704 and the base station 706 may include uplink channels and downlink channels.

In certain embodiments, during or after the setup 708 between the first UE 704 and the base station 706, the first UE 704 may receive radio resource control (RRC) broadcast signals broadcast from the base station 706. The radio resource control broadcast signals may include one or more port indications for uplink communications and a correlated (e.g., mapped) one or more port indications for sidelink communications. For example, during or after the setup 708 between the first UE 704 and the base station 706, the base station 706 may transmit (e.g., broadcast) a radio resource control signal to the first UE 704. The radio resource control signal may include a port indication for an uplink communication and a corresponding (e.g., a mapped) port indication for a sidelink communication. As described herein, because the base station 706 knows the one or more uplink port identifications and the corresponding one or more sidelink port indications (having sent them to the first UE 704), when the base station 706 receives a broadcast transmission from the first UE 704 containing an uplink message superposition coded with a sidelink message associated with the uplink port identification and a sidelink message associated with the sidelink port indication, the base station 706 may decode the sidelink message (which may be ignored or disregarded by the base station 706) based on the sidelink port indication and may decode the uplink message based on the corresponding uplink port identification.

In some cases, when there is only one uplink port identification, the one uplink port identification may correspond to only one sidelink port indication. In some cases, when there are two or more uplink port identifications, the two or more uplink port identifications may correspond to only two sidelink port identifications.

Wireless communication services may also be setup 712 between the first UE 704 and a second UE (UE2) 702. For instance, such communication services may be compatible with Evolved Universal Terrestrial Radio Access Network (eUTRAN) wireless communication protocols, often referred to as Long-Term Evolution (LTE). The communication channels providing wireless communication between the first UE 704 and the second UE 702 may include sidelink channels.

After the respective services are set up, the first UE 704 may wish to send an uplink message to the base station 706 and a sidelink message to the second UE 702. The first UE 704 may record a path loss 714 experienced over a sidelink communication channel between the first UE 704 and the second UE 702. The first UE 704 may use the recorded path loss experienced over the sidelink communication channel between the first UE 704 and the second UE 702 to report a sidelink quality to the base station 706.

In certain embodiments, the first UE 704 may record and calculate an average path loss experienced over the sidelink communication channel between the first UE 704 and the second UE 702 over a specified time frame (Tw). For example, the first UE 704 may determine a reference signal received power (RSRP) or a reference signal received quality (RSRQ) of a sidelink communication channel between the first UE 704 and the second UE 702. The reference signal received power may be power of the reference signals spread over the full bandwidth and a narrow band. Similarly, the reference signal received quality may be the quality of the reference signal spread over the full bandwidth and a narrow band. The first UE 704 may also receive sidelink control information (SCI) 716, for example, carried by a Physical Sidelink Control Channel (PSCCH), from and decoded by one or more nearby UEs including the second UE 702. In some examples, the first UE 704 may also record a path loss 718 experienced over an uplink communication channel between the first UE 704 and the base station 706.

After recording the path loss 714 experienced over the sidelink communication channel and after receiving the sidelink control information (SCI) 716 from the second UE 702, the first UE 704 may report to the base station 706 the sidelink quality 720 of the sidelink communication channel between the first UE 704 and the second UE 702. The sidelink quality may be determined using the path loss (e.g., an average path loss over a period of time (Tw)) recorded by the first UE 704 over the sidelink communication channel between the first UE 704 and the second UE 702. Concurrently (such as through the same transmission used for reporting sidelink quality), or subsequently (such as through another transmission), the first UE 704 may report to the base station 706 the uplink path loss 722 of the uplink communication channel between the first UE 704 and the base station 706. The first UE 704 may also report to the base station 706 the sidelink control information 724 received from the second UE 702.

After (e.g., in response to) receiving the sidelink quality report, the uplink path loss report, and, the sidelink control information report from the first UE 704, the base station 706 may select 726 an uplink port identification for receiving an uplink message from the first UE 704. The uplink port identification may be an uplink port identification previously provided to the first UE 704 (for example, through an RRC signal previously sent the first UE 704) along with a correlating (e.g., mapped) sidelink port identification so that the first UE 704 and the base station 706 know and use the same uplink port identification and an identifiable correlating (e.g., mapped) sidelink port identification for an uplink message and a sidelink message, respectively.

After the base station 706 selects an uplink port identification, the base station 706 may transmit 728 to the first UE 704 the selected uplink port identification. For example, the base station 706 may select an uplink modulation index for receiving an uplink message from the first UE 704 based on at least one of the sidelink quality report or the uplink path loss report. In some embodiments, when the base station 706 transmits the selected uplink port identification, the base station 706 may also transmit updated mapping information for dynamic uplink port identification and sidelink port identification mapping. Otherwise, the first UE 704 may utilize mapping information previously received from the base station 706 (e.g., during a previously provided RRC transmission). The selected one or more uplink port identifications may be transmitted to the first UE 704 through a downlink control information (DCI) transmission.

After the first UE 704 receives an uplink port identification from the base station 706, the first UE 704 may map the received uplink port identification to a sidelink port identification and select that sidelink port identification 730 for association with a sidelink message based on the mapping. For example, the base station 706 may have previously provided mapping information that maps a single received uplink port identification to one single sidelink port identification. As such, the first UE 704, upon receiving an uplink port identification from the base station 706, may map the received uplink port identification to the one sidelink port identification and may select the one sidelink port identification based on the mapping. As another example, the base station 706 may have previously providing mapping information that maps a received uplink port identification of two or more uplink port identifications to two sidelink port identifications. As such, the first UE 704, upon receiving an uplink port identification of the two or more uplink port identifications from the base station 706, may map the received uplink port identification to the one of two sidelink port identification and may select the one sidelink port identification based on the mapping.

The first UE 704 may associate the uplink message with the received uplink port identification and may associate the sidelink message with the selected sidelink port identification 732. The first UE 704 may superposition code 734 the uplink message and the sidelink message into a transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission.

The first UE 704 may transmit the broadcast transmission 736 including the uplink message superposition coded with the sidelink message so that both the base station 706 and the second UE 702 receive the broadcast transmission and both messages. Subsequently, the second UE 702 may receive the broadcast transmission and may decode the sidelink message 738 using, for example, the sidelink control information previously provided 716 from the second UE 702 to the first UE 704. In an embodiment, the second UE 702 may be unable to decode the uplink message because the second UE 702 may not have received the associated uplink port identification from the base station 706 and used to decode the uplink message.

As mentioned herein, the base station 706 may receive the broadcast transmission including the uplink message superposition coded with the sidelink message. The base station 706 may decode the previously received sidelink control information to determine which of the sidelink port identifications were associated with the sidelink message 740. Subsequently, the base station 706 may decode the sidelink control information received from the first UE 704 to determine which sidelink port identification is associated with the sidelink message 742. Once the base station 706 decodes the sidelink message from the broadcast transmission, the base station 706 may decode the uplink message from the broadcast transmission based on the uplink message's association with the uplink port identification mapped to the sidelink port identification 742. In some embodiments, the base station 706 may disregard the sidelink message after decoding it.

It should be understood that the system 700 including the second UE 702, the first UE 704, and the base station 706 may implement any one or more procedures described herein in addition to the procedure described herein with respect to FIG. 7. For example, in addition to the system 700 implementing the one or more procedures described herein with respect to FIG. 7, the system 700 including the second UE 702, the first UE 704, and the base station 706 may implement any one or more procedures described herein with respect to any one or more of FIGS. 4, 6, 9, 10, 11, 13, 14, and 15.

Figure 8:
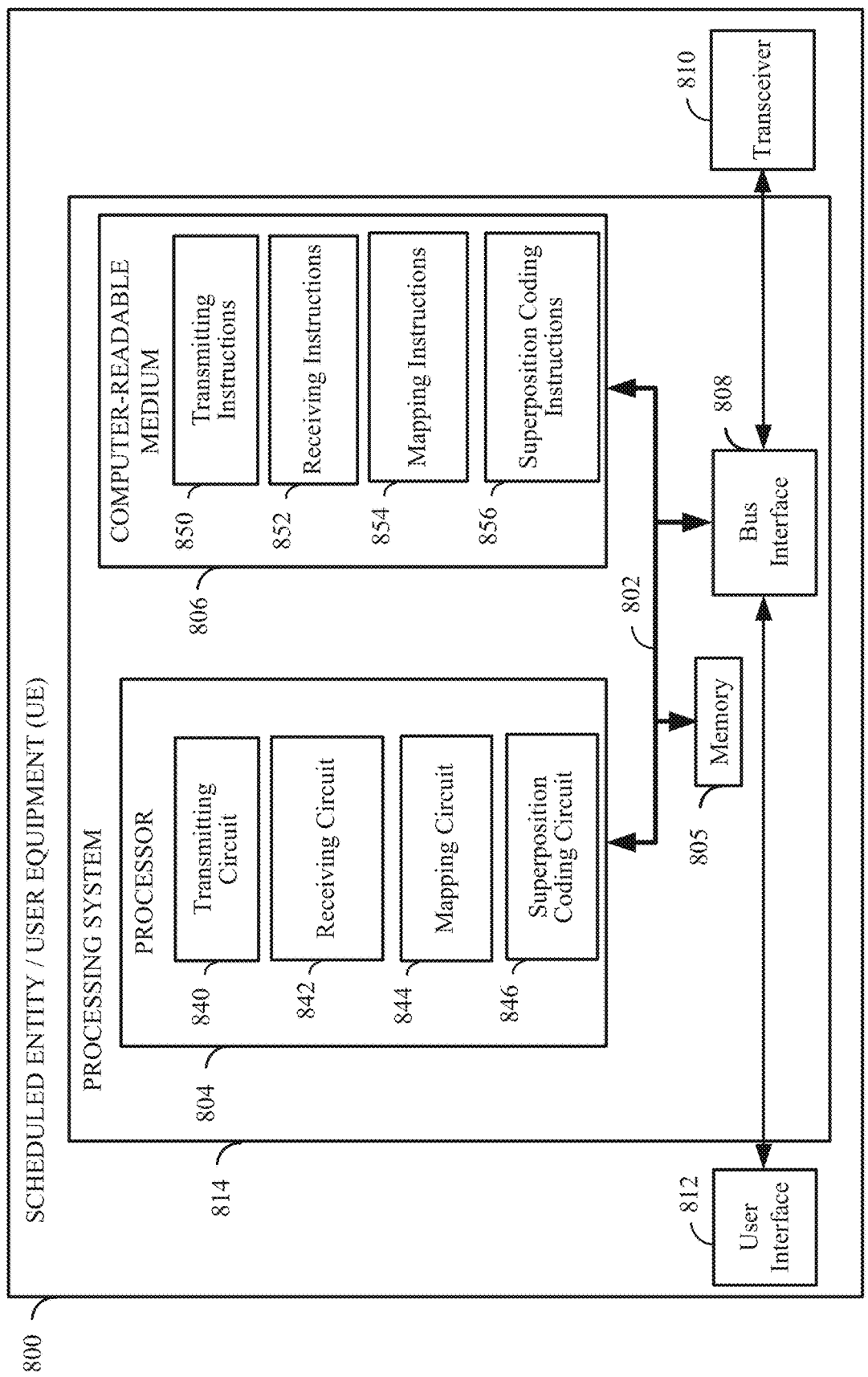
FIG. 8 is a conceptual diagram illustrating an example of a hardware implementation for an example scheduled entity or UE adapted for superposition coding and transmission of a sidelink message and an uplink message.

FIG. 8 is a conceptual diagram illustrating an example of a hardware implementation for an example scheduled entity or UE 800 adapted for superposition coding and transmission of a sidelink message and an uplink message. In some examples, the scheduled entity 800 may be a UE as illustrated in any one or more of FIGS. 1-4 and 6-15.

The scheduled entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 800 may be configured to perform any one or more of the functions described herein. That is, the processor 804, as utilized in the scheduled entity 800, may be used to implement any one or more of the processes and procedures described and illustrated in FIGS. 1-4 and 6-15.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 may provide a communication interface or means for wirelessly communicating with various other apparatus over a transmission medium. Depending upon the nature of the apparatus, a user interface 812 (e.g., keypad, display, speaker, microphone, joystick) may also be provided.

In some aspects of the disclosure, the processor 804 may include a transmitting circuit 840 configured to perform various functions, including, for example, transmitting, to a scheduling entity (e.g., a base station, a radio access network (RAN) entity) a sidelink path loss of a sidelink communication channel of the scheduled entity, and the uplink path loss of the uplink communication channel for enabling the scheduling entity to select the uplink modulation index for communication to the scheduled. The transmitting circuit 840 may also be configured to perform various functions, including, for example, transmitting, to the scheduling entity, the broadcast transmission and sidelink control information associated with the sidelink message for enabling the scheduling entity to decode the uplink message. Additionally, or alternatively, the transmitting circuit 840 may be configured to perform various functions, including, for example, transmitting, to a scheduling entity, a broadcast transmission and a selected indictor of a sidelink port associated with a sidelink message for enabling the scheduling entity to decode an uplink message.

In some aspects of the disclosure, the processor 804 may include a receiving circuit 842 configured to perform various functions, including, for example, receiving, from the scheduling entity, an uplink modulation index associated with an uplink message. The uplink modulation index may be based on a sidelink path loss of a sidelink communication channel of the scheduled entity and an uplink path loss of an uplink communication channel for communication between the scheduled entity and the scheduling entity. The receiving circuit 842 may also be configured to perform various functions, including, for example, receiving, from scheduling entity, one or more downlink control information messages for scheduling a transmission of both a sidelink message and an uplink message to the scheduling entity. Additionally or alternatively, the receiving circuit 842 may be configured to perform various functions, including, for example, receiving, from a scheduling entity, one or more indicators of one or more uplink ports associated with an uplink message, wherein the one or more uplink ports are for transmitting the uplink message from the scheduled to the scheduling entity through a communication channel.

In some aspects of the disclosure, the processor 804 may include a mapping circuit 844 configured to perform various functions, including, for example, mapping the uplink modulation index to one or more sidelink modulation indices associated with a sidelink message. The mapping circuit 844 may also be configured to perform various functions, including, for example, mapping one or more indicators of one or more uplink ports to one or more indicators of one or more sidelink ports associated with a sidelink message.

In some aspects of the disclosure, the processor 804 may include a superposition coding circuit 846 configured to perform various functions, including, for example, transmitting, to the scheduling entity, the broadcast transmission and sidelink control information associated with the sidelink message for enabling the scheduling entity to decode the uplink message. The superposition coding circuit 846 may also be configured to perform various functions, including, for example, superposition coding an uplink message and a sidelink message into a single slot of a broadcast transmission based on one or more downlink control information messages. Additionally, or alternatively, the superposition coding circuit 846 may also be configured to perform various functions, including, for example, superposition coding an uplink message and a sidelink message into a broadcast transmission using one or more indicators of one or more uplink ports and a selected indictor of a sidelink port of one or more indicators of one or more sidelink ports.

The processor 804 may be responsible for managing the bus 802 and general processing, including the execution of software stored on the computer-readable medium 806. The software, when executed by the processor 804, causes the processing system 814 to perform the various functions described herein, including those functions describe with respect to FIGS. 1-15. The computer-readable medium 806 and the memory 805 may also be used for storing data that is manipulated by the processor 804 when executing software.

One or more processors 804 in the processing system may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include transmitting software or instructions 850, receiving software or instructions 852, mapping software or instructions 854, or superposition coding software or instructions 856. Of course, in the examples provided herein, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-4 and 6-15 and utilizing, for example, the processes or algorithms described herein.

Of course, in the examples provided herein, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-4 and 6-15 and utilizing, for example, the processes or algorithms described herein.

Figure 9:
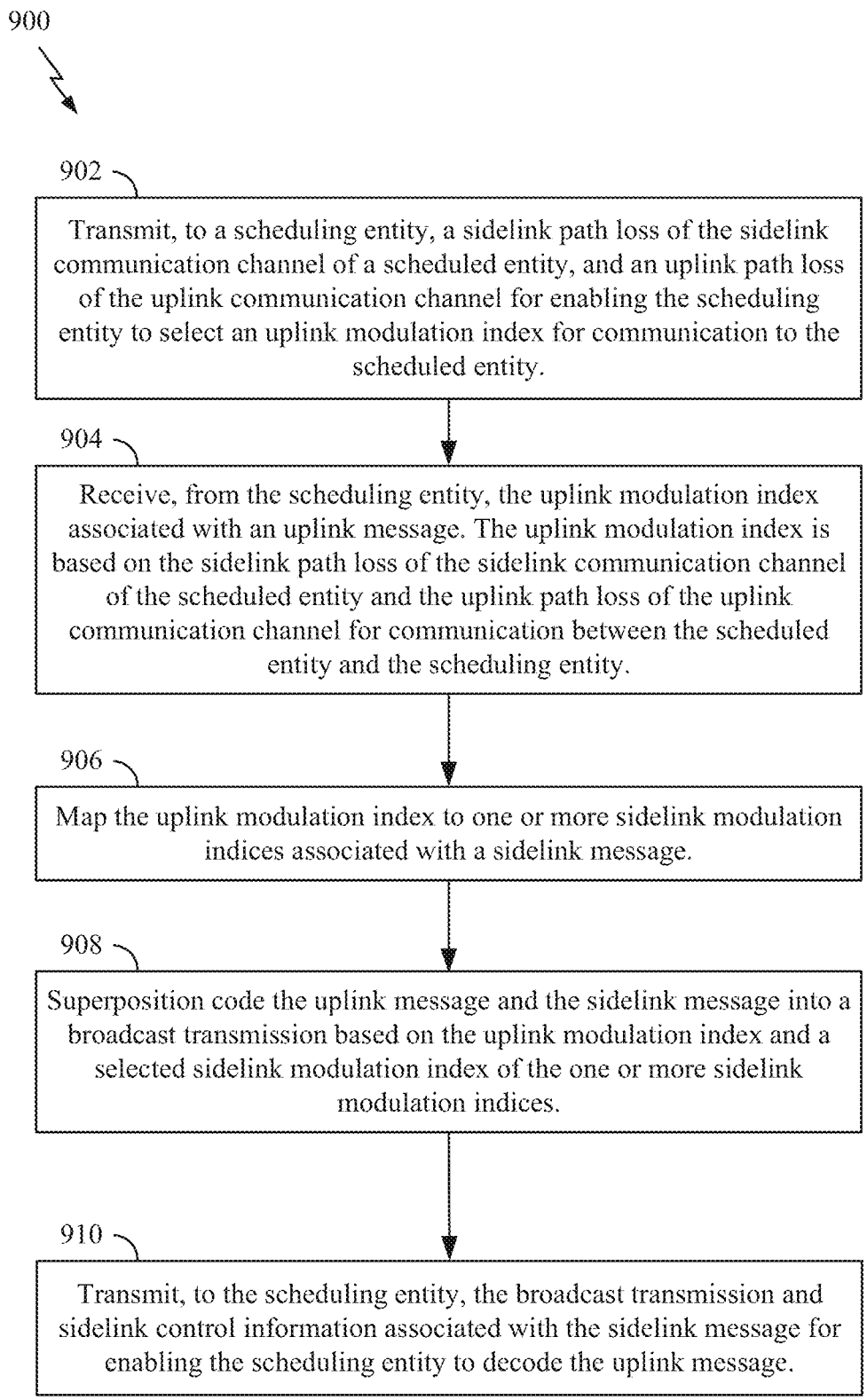
FIG. 9 is a flow chart illustrating an example method operational at a scheduled entity for superposition coding and transmission of a sidelink message and an uplink message.

FIG. 9 is a flow chart illustrating an example method 900 operational at a scheduled entity, for example, a user equipment for superposition coding and transmission of a sidelink message and an uplink message. The method 900 may implement superposition coding and transmission of a sidelink message and an uplink message using modulation indices. In some examples, the method 900 may be carried out by any suitable apparatus or means for carrying out the functions or algorithm described herein.

At block 902, the scheduled entity may transmit, to the scheduling entity (e.g., a RAN entity), the sidelink path loss of the sidelink communication channel of the scheduled entity, and the uplink path loss of the uplink communication channel for enabling the scheduling entity to select the uplink modulation index for communication to the scheduled entity. For example, a scheduled entity may record a path loss experienced over a sidelink communication channel between the scheduled entity and another scheduled entity. The scheduled entity may use the recorded path loss experienced over the sidelink communication channel between the scheduled entity and the other scheduled entity to report a sidelink quality to the scheduling entity.

In certain embodiments, the scheduled entity may record and calculate an average path loss experienced over the sidelink communication channel over a specified time frame ($T_w$). For example, the scheduled entity may determine a reference signal received power (RSRP) or a reference signal received quality (RSRQ) of a sidelink communication channel between the scheduled entity and the other scheduled entity. The reference signal received power may be power of the reference signals spread over the full bandwidth and a narrow band. Similarly, the reference signal received quality may be the quality of the reference signal spread over the full bandwidth and a narrow band. The scheduled entity may also receive sidelink control information (SCI), for example, carried by a Physical Sidelink Control Channel (PSCCH), from and decoded by one or more nearby other scheduled entities including the other scheduled entity. In some examples, the scheduled entity may also record a path loss experienced over an uplink communication channel between the scheduled entity and the scheduling entity.

After recording the path loss experienced over the sidelink communication channel and after receiving the sidelink control information (SCI) from the other scheduled entity, the scheduled entity may report to the scheduling entity the sidelink quality of the sidelink communication channel. The sidelink quality may be determined using the path loss (e.g., an average path loss over a period of time (Tw)) recorded by the scheduled entity over the sidelink communication channel. Concurrently (such as through the same transmission used for reporting sidelink quality), or subsequently (such as through another transmission), the scheduled entity may report to the scheduling entity the uplink path loss of the uplink communication channel between the scheduled entity and the scheduling entity. The scheduled entity may also report to the scheduled entity the sidelink control information received from the other scheduled entity.

At block 904, the scheduled entity may receive, from scheduling entity, an uplink modulation index associated with an uplink message. In certain embodiments, the uplink modulation index may be based on a sidelink path loss of a sidelink communication channel of the scheduled entity and an uplink path loss of an uplink communication channel for communication between the scheduled entity and the scheduling entity. In some embodiments, the sidelink path loss of the sidelink communication channel of the scheduled entity may be based on a reference signal received power indication of the sidelink communication channel and sidelink control information from one or more other scheduled entities. In some embodiments, when the scheduled entity receives, from the scheduling entity, the uplink modulation index, the scheduled entity may receive, from the scheduling entity, a modulation and control scheme range containing the uplink modulation index. In some instances, the modulation and control scheme range may include the one or more sidelink modulation indices. When the scheduled entity receives, from the scheduling entity, the uplink modulation index, the scheduled entity may receive, from the scheduling entity, modulation and control scheme mapping information for mapping the uplink modulation index to the one or more sidelink modulation indices.

For example, after (e.g., in response to) receiving the sidelink quality report, the uplink path loss report, and, the sidelink control information report from the scheduled entity, the scheduling entity may select an uplink modulation index for receiving an uplink message from the scheduled entity. For example, the base station may select an uplink modulation index for receiving an uplink message from the first UE based on at least one of the sidelink quality report or the uplink path loss report. The uplink modulation index may be an uplink modulation index previously provided to the scheduled entity (for example, through an RRC signal previously sent to the scheduled entity) along with a correlating (e.g., mapped) sidelink modulation indices so that the scheduled entity and the scheduling entity know and use the same uplink modulation index and an identifiable correlating (e.g., mapped) sidelink modulation index for an uplink message and a sidelink message, respectively.

After the scheduling entity selects an uplink modulation index, the scheduling entity may transmit to the scheduled entity the selected uplink modulation index. In some embodiments, when the scheduling entity transmits the selected uplink modulation index, the scheduling entity may also transmit updated mapping information for dynamic uplink modulation index and sidelink modulation index mapping. Otherwise, the scheduled entity may utilize mapping information previously received from the scheduling entity (e.g., during a previously provided RRC transmission). The selected one or more uplink modulation indices may be transmitted to the scheduled entity through a downlink control information (DCI) transmission.

At block 906, the scheduled entity may map the uplink modulation index to one or more sidelink modulation indices associated with a sidelink message. For example, after the scheduled entity receives an uplink modulation index from the scheduling entity, the scheduled entity may map the received uplink modulation index to a sidelink modulation index and select that sidelink modulation index for encoding of a sidelink message based on the mapping. The scheduling entity may have previously provided mapping information that maps a received uplink modulation index to one or more specific sidelink modulation indices. As such, the scheduled entity, upon receiving an uplink modulation index from the scheduled entity, may map the received uplink modulation index to the one or more particular sidelink modulation indices and select one sidelink modulation indices from the one or more particular sidelink modulation index based on the mapping. As another example, the scheduling entity may provide with the transmission of the uplink modulation index or may have previously provided mapping information that maps each of a plurality of uplink modulation indices to one or more sidelink modulation indices as shown in Table 500 of FIG. 5. The scheduled entity, upon receiving an uplink modulation index from the scheduling entity, may map the received uplink modulation index to the one or more particular sidelink modulation indices indicated in the Table 500 and select one sidelink modulation indices from the one or more particular sidelink modulation index based on the mapping.

At block 908, the scheduled entity may superposition code the uplink message and the sidelink message into a broadcast transmission based on the uplink modulation index and a selected sidelink modulation index of the one or more sidelink modulation indices. For example, the scheduled entity may encode the uplink message according to the received uplink modulation index and may encode the sidelink message according to the selected sidelink modulation index. The scheduled entity may superposition code the encoded uplink message and the encode sidelink message into a transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission.

At block 910, the scheduled entity may transmit, to the scheduling entity, the broadcast transmission and sidelink control information associated with the sidelink message for enabling the scheduling entity to decode the uplink message. For example, the scheduled entity may transmit the broadcast transmission including the uplink message superposition coded with the sidelink message so that both the scheduling entity and the other scheduled entity receive the broadcast transmission and both messages. The scheduling entity may receive the broadcast transmission including the uplink message superposition coded with the sidelink message. The scheduling may decode the previously received sidelink control information to determine which of the sidelink modulation indices were used to encode the sidelink message. In certain embodiments, the scheduling entity may have previously indicated that MCS-2 from the Table 500 of FIG. 5, and the uplink modulation index $a_2$ be used by the scheduled entity for encoding the uplink message. MCS-2 may map the uplink modulation index $a_2$ to both sidelink modulation indices $b_2$ and $c_2$. The scheduled entity may have selected sidelink modulation index $b_2$ of $b_2$ and $c_2$ as the sidelink modulation index used for encoding the sidelink message. Subsequently, the scheduling entity may decode the sidelink control information received from the scheduled entity to determine that $b_2$ of $b_2$ and $c_2$ is used to encode the sidelink message. Once the scheduling entity decodes the sidelink message from the broadcast transmission, the scheduling entity may decode the uplink message from the broadcast transmission using the uplink modulation index $a_2$ mapped to $b_2$. In some embodiments, the scheduling entity may disregard the sidelink message after decoding it.

In some embodiments, the other scheduled entity may receive the broadcast transmission and may decode the encoded sidelink message using, for example, the sidelink control information previously provided from the other scheduled entity to the scheduled entity. In an embodiment, the other schedule entity may be unable to decode the uplink message because the other scheduled entity may not have the uplink modulation index provided by the scheduling entity and used to decode the uplink message.

Figure 10:
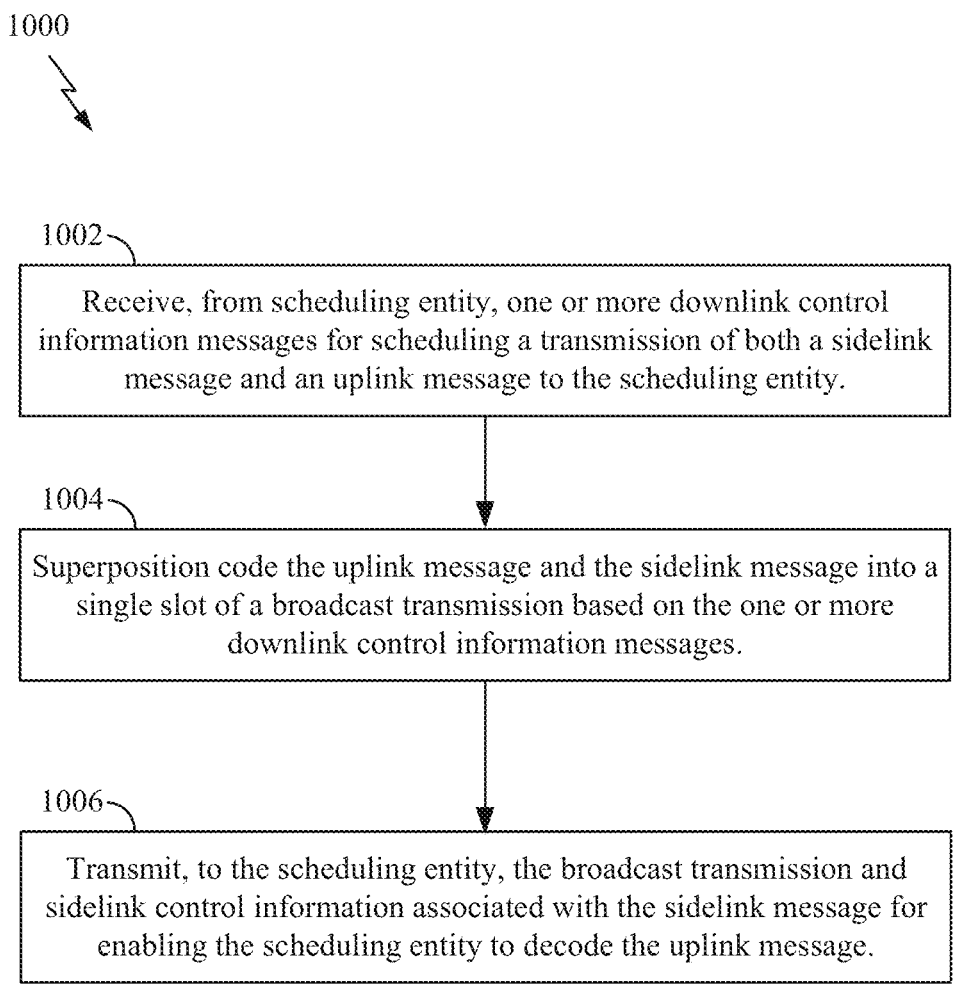
FIG. 10 is another flow chart illustrating an example method operational at a scheduled entity for superposition coding and transmission of a sidelink message and an uplink message.

FIG. 10 is a flow chart illustrating an example method 1000 operational at a scheduled entity, for example, a user equipment for superposition coding and transmission of a sidelink message and an uplink message. The example method 1000 may implement superposition coding and transmission of a sidelink message and an uplink message using downlink control information messages. In some examples, the method 1000 may be carried out by any suitable apparatus or means for carrying out the functions or algorithm described herein.

At block 1002, the scheduled entity may receive, from a scheduling entity (e.g., a base station, a radio access network (RAN) entity), one or more downlink control information messages for scheduling a transmission of both a sidelink message and an uplink message to the RAN entity. In some embodiments, the one or more downlink control information messages may include one downlink control information message for scheduling a transmission of both the sidelink message and the uplink message in a same timeline. In some embodiments, the one or more downlink control information message may include a first downlink control information message for scheduling the transmission of the uplink message and a second downlink control information message for scheduling a sidelink message. In some embodiments, the single slot of the broadcast transmission (e.g., a broadcast message) may be another slot (n+T) identified in the one downlink control information message. In some examples, the one downlink control information message may indicate that a resource of the sidelink message is a subset of a resource of the uplink message or that a resource of the uplink message is a subset of a resource of the sidelink message. At block 1004, the scheduled entity may superposition code the uplink message and the sidelink message into a single slot of a broadcast transmission based on the one or more downlink control information messages.

For example, the scheduled entity may wish to send an uplink message to the scheduling entity and a sidelink message to another scheduled entity. The scheduling entity may transmit one or more downlink control information (DCI) messages to the scheduled entity. In Release 14 and 16, a scheduled entity may send two downlink control information messages: a first downlink control information message for scheduling an uplink message and a second downlink control information message for scheduling a sidelink message. Both the first and second downlink control information messages follow a same timeline to ensure that the uplink message and the sidelink message and transmitted in different slots. For example, when the first and second downlink control information message are transmitted in slot n within the same time, the first downlink control information message will schedule the uplink message for transmission in slot $(n+T_1)$ and the second downlink control information message will schedule the sidelink message for transmission in slot $(n+T_2)$ where $T_1$ and $T_2$ are different times so that the uplink message and the sidelink message are transmitted in different slots on the same time line.

In some examples, when the scheduled entity receives, from the scheduling entity, the one or more downlink control information messages, the scheduled entity may receive the one downlink control information message in a slot n. For example, the scheduled entity may transmit only one downlink control information message to the scheduled entity. The solitary or single downlink control information message may be used for scheduling both the uplink message and the sidelink message. When the solitary downlink control information message is transmitted in slot n, both the uplink message and the sidelink message may be scheduled for transmission in slot (n+T).

After the scheduled entity receives the solitary downlink control information message from the scheduling entity, the scheduled entity may superposition code an uplink message with a sidelink message into a broadcast transmission for concurrent transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission. Because the solitary downlink control information message schedules both the uplink message and the sidelink message for transmission in slot (n+T), the first UE 504 superposition codes the uplink message and the sidelink message in a same slot (n+T) or an overlapping slot (e.g., such that one slot is a subset of the other).

In some embodiments, when the scheduled entity receives, from the scheduling entity, the one or more downlink control information messages, the scheduled entity may receive the first downlink control information message at a slot n and the second downlink control information message at a slot (n+1). In some embodiments, the single slot of the broadcast transmission (e.g., a broadcast message) is another slot (n+5) identified in both the first downlink control information message and the second downlink control information message. In some embodiment, the one or more downlink control information messages may include a first downlink control information message for scheduling a transmission of the sidelink message in a first timeline and a second downlink control information message for scheduling a transmission of the uplink message in a second timeline.

As an example, the scheduling entity may transmit only one downlink control information message to the schedule entity. The solitary or single downlink control information message may be used for scheduling both the uplink message and the sidelink message. For example, when the solitary downlink control information message is transmitted in slot n, both the uplink message and the sidelink message may be scheduled for transmission in slot (n+T).

After the scheduled entity receives the solitary downlink control information message from the scheduling entity, the scheduled entity may superposition code an uplink message with a sidelink message into a broadcast transmission for concurrent transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission. Because the solitary downlink control information message schedules both the uplink message and the sidelink message for transmission in slot (n+T), the scheduled entity superposition codes the uplink message and the sidelink message in a same slot (n+T) or an overlapping slot (e.g., such that one slot is a subset of the other).

At block 1006, the scheduled entity may transmit, to the scheduling entity, the broadcast transmission and sidelink control information associated with the sidelink message for enabling the scheduling entity to decode the uplink message. For example, the scheduled entity may transmit the broadcast transmission including the uplink message superposition coded with the sidelink message so that both the scheduling entity and the other scheduled entity receive the broadcast transmission and both messages. The scheduling entity may receive the broadcast transmission including the uplink message superposition coded with the sidelink message. The scheduling entity may decode the sidelink message and the uplink message from the broadcast transmission. For example, after decoding the sidelink message, the scheduling entity may disregard the sidelink message. After disregarding the sidelink message, the scheduling entity may decode the uplink message from the broadcast transmission based on the timing provided by the scheduling entity for the uplink message.

The other scheduled entity may receive the broadcast transmission and may decode the encoded sidelink message. In an embodiment, the other scheduled entity may be unable to decode the uplink message because the other scheduled entity may not have the timing provided by the scheduling entity for the uplink message.

Figure 11:
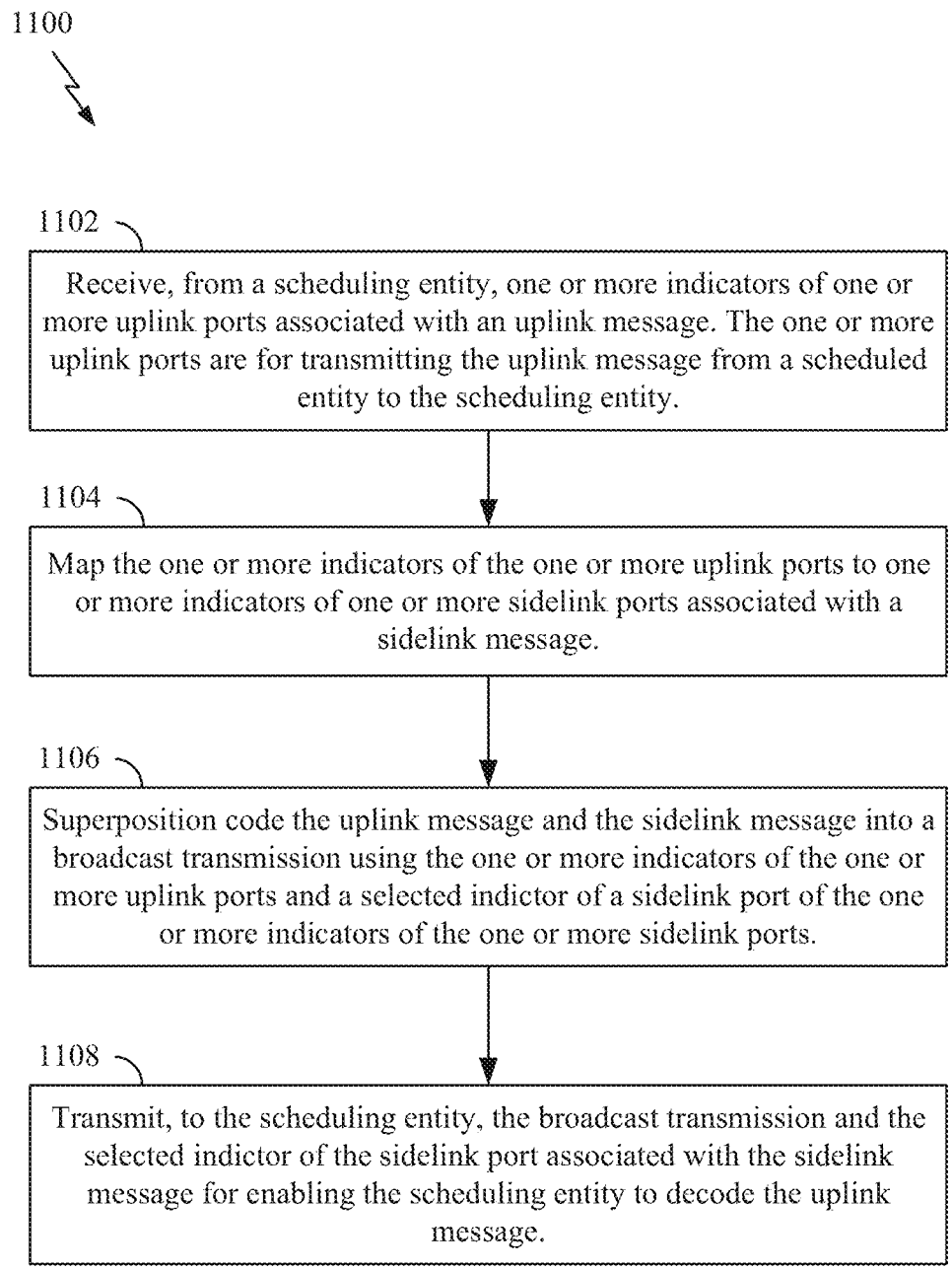
FIG. 11 is yet another flow chart illustrating an example method operational at a scheduled entity for superposition coding and transmission of a sidelink message and an uplink message.

FIG. 11 is a flow chart illustrating an example method 1100 operational at a scheduled entity, for example, a user equipment for superposition coding and transmission of a sidelink message and an uplink message. The example method 1100 may implement superposition coding and transmission of a sidelink message and an uplink message using uplink port indicators. In some examples, the method 1100 may be carried out by any suitable apparatus or means for carrying out the functions or algorithm described herein.

At block 1102, the scheduled entity may receive, from a scheduling entity (e.g., a base station, a radio access network (RAN) entity), one or more indicators of one or more uplink ports associated with an uplink message. In some embodiments, the one or more uplink ports may be for transmitting the uplink message from the scheduled entity (e.g., a UE) to the scheduling entity through a communication channel. In some embodiments, the one or more indicators of the one or more uplink ports may include only one indicator of only one uplink port and the one or more indicators of the one or more sidelink ports may include only one indicator of only one sidelink port. In some embodiments, the one or more indicators of the one or more uplink ports may include two or more indicators of two or more uplink ports. In some embodiments, each indicator of the two or more indicators may be associated with an uplink port of the two or more uplink ports. In some embodiments, the one or more indicators of the one or more sidelink ports may include only two indicators of only two sidelink ports. In certain embodiments, each indicator of the only two sidelink ports may be associated with a sidelink port of the only two sidelink ports.

For example, the scheduled entity may receive radio resource control (RRC) broadcast signals broadcast from the scheduling entity. The radio resource control broadcast signals may include one or more port indications for uplink communications and a correlated (e.g., mapped) one or more port indications for sidelink communications. For example, during or after the setup between the scheduled entity and the scheduling entity, the scheduling entity may transmit (e.g., broadcast) a radio resource control signal to the scheduled entity. The radio resource control signal may include a port indication for an uplink communication and a corresponding (e.g., a mapped) port indication for a sidelink communication. As described herein, because the scheduling entity knows the one or more uplink port identifications and the corresponding one or more sidelink port identifications (having sent them to the scheduled entity), when the scheduling entity receives a broadcast transmission from the scheduled entity containing an uplink message superposition coded with a sidelink message associated with the uplink port identification and a sidelink message associated with the sidelink port identification, the scheduling entity may decode the sidelink message (which may be ignored or disregarded by the scheduling entity) based on the sidelink port identification and may decode the uplink message based on the corresponding uplink port identification.

In some cases, when there is only one uplink port identification, the one uplink port identification may correspond to only one sidelink port identification. In some cases, when there are two or more uplink port identifications, the two or more uplink port identifications may correspond to only two sidelink port identifications.

The scheduled entity may wish to send an uplink message to the scheduling entity and a sidelink message to another scheduled entity. The scheduled entity may record a path loss experienced over a sidelink communication channel between the scheduled entity and the other scheduled entity. The scheduled entity may use the recorded path loss experienced over the sidelink communication channel to report a sidelink quality to the scheduling entity.

In certain embodiments, the scheduled entity may record and calculate an average path loss experienced over the sidelink communication channel between the over a specified time frame ($T_w$). For example, the scheduled entity may determine a reference signal received power (RSRP) or a reference signal received quality (RSRQ) of a sidelink communication channel. The reference signal received power may be power of the reference signals spread over the full bandwidth and a narrow band. Similarly, the reference signal received quality may be the quality of the reference signal spread over the full bandwidth and a narrow band. The scheduled entity may also receive sidelink control information (SCI), for example, carried by a Physical Sidelink Control Channel (PSCCH), from and decoded by one or more nearby scheduled entities including the other scheduled entity. In some examples, the scheduled entity may also record a path loss experienced over an uplink communication channel between the scheduled entity and the scheduling entity.

After recording the path loss experienced over the sidelink communication channel and after receiving the sidelink control information (SCI) from the other scheduled entity, the scheduled entity may report to the scheduling entity the sidelink quality of the sidelink communication channel between the scheduled entity and the scheduling entity. The sidelink quality may be determined using the path loss (e.g., an average path loss over a period of time (Tw)) recorded by the scheduled entity over the sidelink communication channel. Concurrently (such as through the same transmission used for reporting sidelink quality), or subsequently (such as through another transmission), the scheduled entity may report to the scheduling entity the uplink path loss of the uplink communication channel between the scheduled entity and the scheduling entity. The scheduled entity may also report to the scheduling entity the sidelink control information received from the other scheduled entity.

After (e.g., in response to) receiving the sidelink quality report, the uplink path loss report, and, the sidelink control information report from the scheduled entity, the scheduling entity may select an uplink port identification for receiving an uplink message from the scheduled entity. The uplink port identification may be an uplink port identification previously provided to the scheduled entity (for example, through an RRC signal previously sent the scheduled entity) along with a correlating (e.g., mapped) sidelink port identification so that the scheduled entity and the scheduling entity know and use the same uplink port identification and an identifiable correlating (e.g., mapped) sidelink port identification for an uplink message and a sidelink message, respectively.

After the scheduling entity selects an uplink port identification, the scheduling entity may transmit to the first UE the selected uplink port identification. For example, the base station may select an uplink modulation index for receiving an uplink message from the first UE based on at least one of the sidelink quality report or the uplink path loss report. In some embodiments, when the scheduling entity transmits the selected uplink port identification, the scheduling entity may also transmit updated mapping information for dynamic uplink port identification and sidelink port identification mapping. Otherwise, the scheduled entity may utilize mapping information previously received from the scheduling entity (e.g., during a previously provided RRC transmission). The selected one or more uplink port identifications may be transmitted to the scheduled entity through a downlink control information (DCI) transmission.

At block 1104, the scheduled entity may map the one or more indicators of the one or more uplink ports to one or more indicators of one or more sidelink ports associated with a sidelink message. For example, after the scheduled entity receives an uplink port identification from the scheduling entity, the scheduled entity may map the received uplink port identification to a sidelink port identification and select that sidelink port identification for association with a sidelink message based on the mapping. For example, the scheduling entity may have previously provided mapping information that maps a single received uplink port identification to one single sidelink port identification. As such, the scheduled entity, upon receiving an uplink port identification from the scheduling entity, may map the received uplink port identification to the one sidelink port identification and may select the one sidelink port identification based on the mapping. As another example, the scheduling entity may have previously providing mapping information that maps a received uplink port identification of two or more uplink port identifications to two sidelink port identifications. As such, the scheduled entity, upon receiving an uplink port identification of the two or more uplink port identifications from the scheduling entity, may map the received uplink port identification to the one of two sidelink port identification and may select the one sidelink port identification based on the mapping.

At block 1106, the scheduled entity may superposition code the uplink message and the sidelink message into a broadcast transmission using the one or more indicators of the one or more uplink ports and a selected indictor of a sidelink port of the one or more indicators of the one or more sidelink ports. For example, the scheduled entity may associate the uplink message with the received uplink port identification and may associate the sidelink message with the selected sidelink port identification. The scheduled entity may superposition code the uplink message and the sidelink message into a transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission.

At block 1108, the scheduled entity may transmit, to the scheduling entity, the broadcast transmission and the selected indictor of the sidelink port associated with the sidelink message for enabling the scheduling entity to decode the uplink message. For example, the scheduled entity may transmit the broadcast transmission including the uplink message superposition coded with the sidelink message so that both the scheduling entity and the other scheduled entity receive the broadcast transmission and both messages. The scheduling entity may receive the broadcast transmission including the uplink message superposition coded with the sidelink message. The scheduling entity may decode the previously received sidelink control information to determine which of the sidelink port identifications were associated with the sidelink message. Subsequently, the scheduling entity may decode the sidelink control information received from the scheduled entity to determine which sidelink port identification is associated with the sidelink message. Once the scheduled entity decodes the sidelink message from the broadcast transmission, the scheduling entity may decode the uplink message from the broadcast transmission based on the uplink message's association with the uplink port identification mapped to the sidelink port identification. In some embodiments, the scheduling entity may disregard the sidelink message after decoding it.

The other scheduled entity may receive the broadcast transmission and may decode the sidelink message using, for example, the sidelink control information previously provided by the other scheduled entity to the scheduled entity. In an embodiment, the other scheduled entity may be unable to decode the uplink message because the other scheduled entity may not have received the associated uplink port identification from the scheduling entity and used to decode the uplink message.

Figure 12:
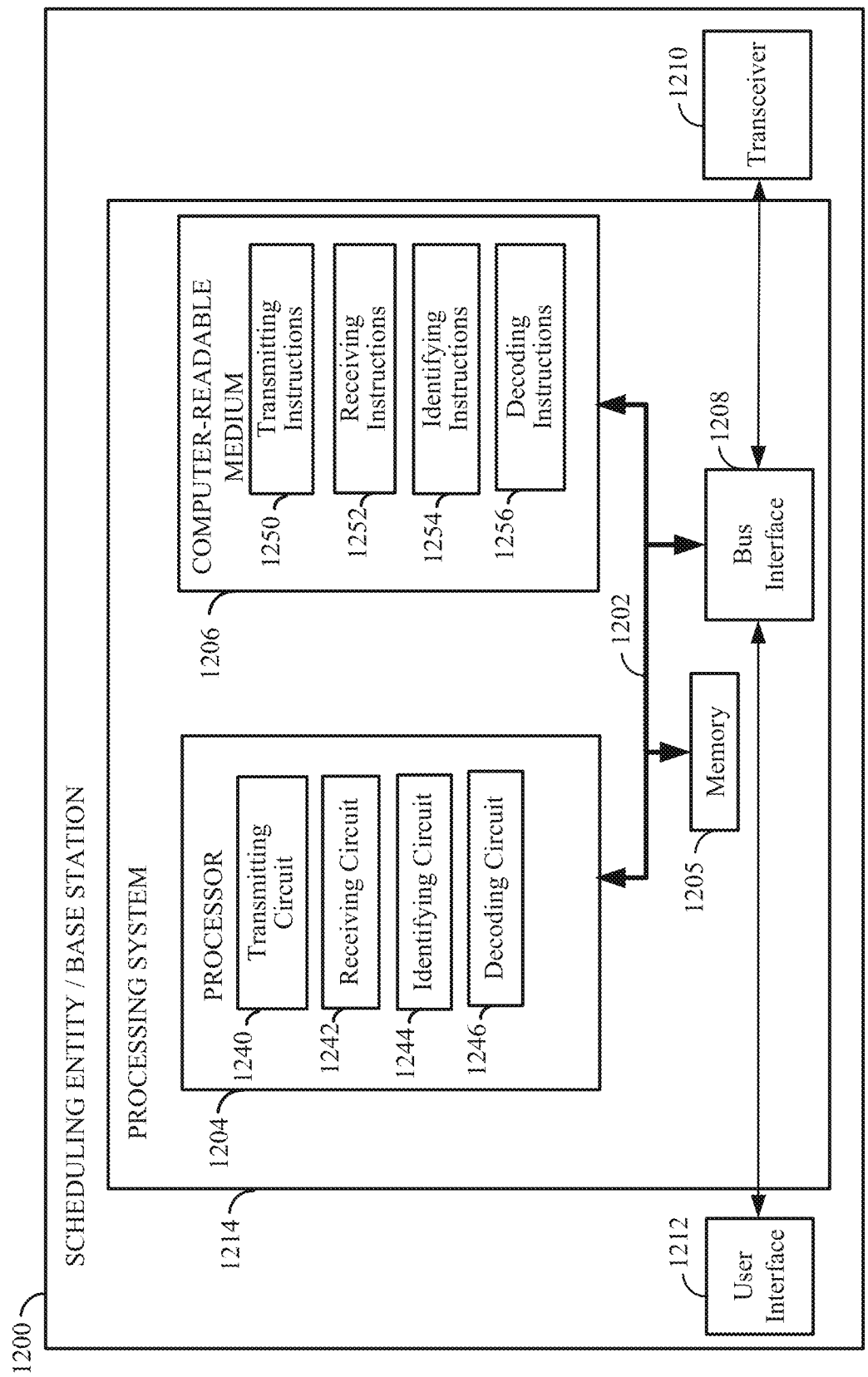
FIG. 12 is a block diagram conceptually illustrating an example of a hardware implementation for a scheduling entity or base station according to some aspects of the disclosure.

FIG. 12 is a conceptual diagram illustrating an example of a hardware implementation for an example scheduling entity or base station 1200 adapted for superposition coding and transmission of a sidelink message and an uplink message. For example, the scheduling entity or base station 1200 (e.g., gNodeB, managed mobile network node, RAN entity, or network node) may perform any of the functions illustrated and described in FIGS. 1-4 and 6-15.

The scheduling entity or base station 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity or base station 1200 may be configured to perform any one or more of the functions described herein. That is, the processor 1204, as utilized in the scheduling entity or base station 1200, may be used to implement any one or more of the processes and procedures described in FIGS. 1-4 and 6-15 and further illustrated in the flow diagrams discussed herein.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick) may also be provided.

In some aspects of the disclosure, the processor 1204 may include a transmitting circuit 1240 configured for various functions, including, for example, transmitting, to a scheduled entity (e.g., a UE), an uplink modulation index for an uplink message. In some aspects of the disclosure, the processor 1204 may include a receiving circuit 1242 configured for various functions, including, for example, receiving, from the scheduled entity, a broadcast transmission comprising a sidelink message, the uplink message, and sidelink control information associated with the sidelink message. The sidelink message and the uplink message may be contained in the broadcast transmission using superposition coding.

In some aspects of the disclosure, the processor 1204 may include an identifying circuit 1244 configured for various functions, including, for example, identifying a sidelink modulation index of the sidelink message by decoding the sidelink control information. The sidelink modulation index may be mapped to the uplink modulation index. In some aspects of the disclosure, the processor 1204 may include a decoding circuit 1246 configured for various functions, including, for example, decoding the uplink message based on (1) decoding the sidelink message using the sidelink modulation index, and (2) mapping the sidelink modulation index to the uplink modulation index.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1206 may include transmitting software or instructions 1250, receiving software or instructions 1252, identifying software or instructions 1254, or decoding software or instructions 1256. Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1-4 and 6-15 and utilizing, for example, the processes or algorithms described herein.

Figure 13:
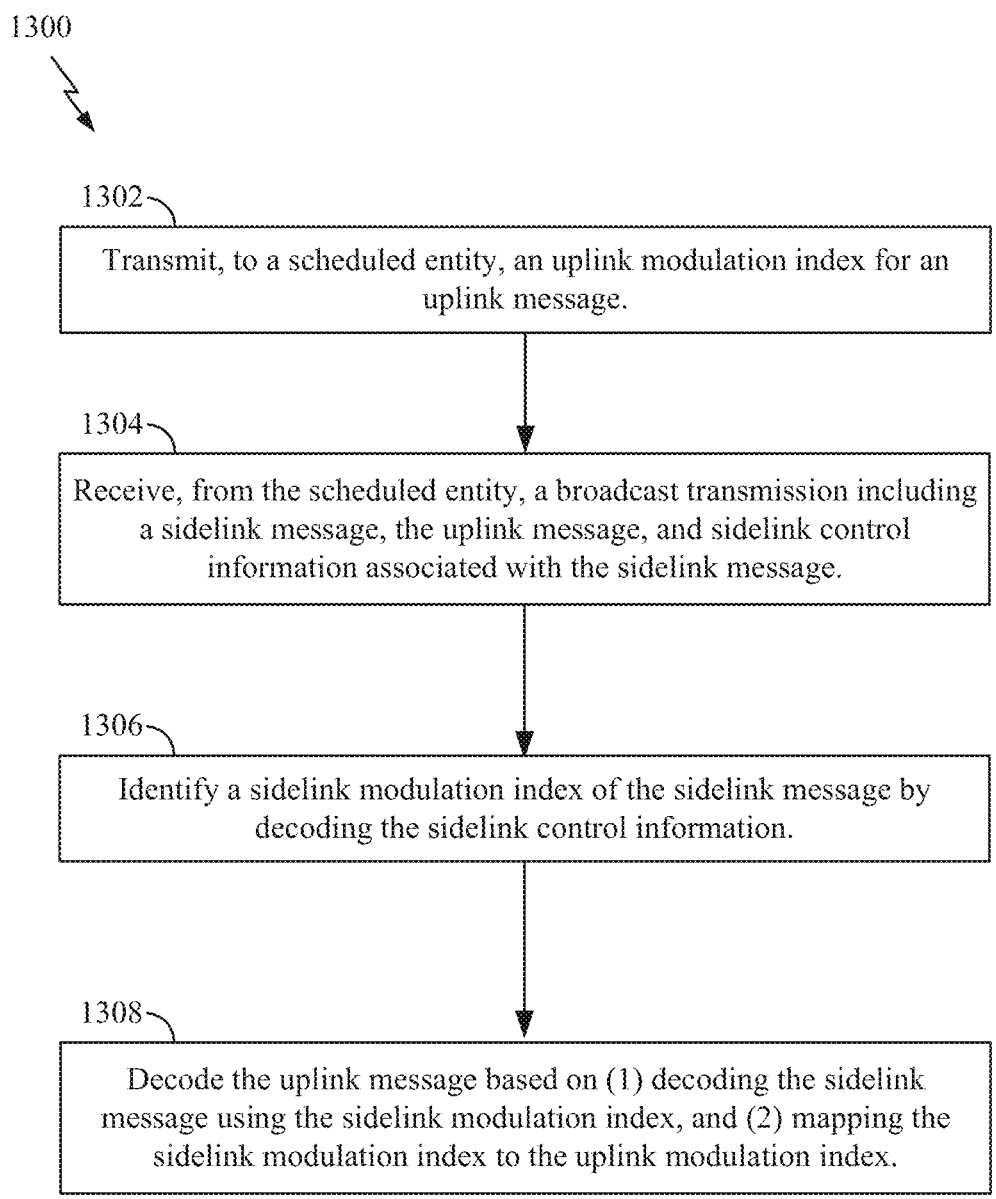
FIG. 13 is a flow chart illustrating an example method operational at a scheduling entity for superposition coding and transmission of a sidelink message and an uplink message.

FIG. 13 is a flow chart illustrating an example method 1300 operational at a scheduling entity, for example, a radio access network (RAN) entity or base station for superposition coding and transmission of a sidelink message and an uplink message. The method 1300 may implement superposition coding and transmission of a sidelink message and an uplink message using modulation indices. In some examples, the method 1300 may be carried out by any suitable apparatus or means for carrying out the functions or algorithm described herein.

At block 1302, the scheduling entity (e.g., a base station or a radio access network (RAN) entity) may transmit, to a scheduled entity (e.g., a UE), an uplink modulation index for an uplink message. In some embodiments, when the scheduling entity transmits, to the scheduled entity, the uplink modulation index, the scheduling entity may transmit, to the scheduled entity, a modulation and control scheme range containing the uplink modulation index. The modulation and control scheme range may include one or more sidelink modulation indices including the sidelink modulation index. In some embodiments, when the scheduling entity transmits, to the scheduled entity, the uplink modulation index, the scheduling entity may transmit, to the scheduled entity, modulation and control scheme mapping information for mapping the uplink modulation index to the sidelink modulation index. In some embodiments, the modulation and control scheme mapping information may be for mapping the uplink modulation index to at least the sidelink modulation index of the one or more sidelink modulation indices. The modulation and control scheme range and the modulation and control scheme mapping information may be based on a path loss of a sidelink communication channel associated with the scheduled entity.

For example, a scheduled entity may record a path loss experienced over a sidelink communication channel between the scheduled entity and another scheduled entity. The scheduled entity may use the recorded path loss experienced over the sidelink communication channel between the scheduled entity and the other scheduled entity to report a sidelink quality to the scheduling entity.

In certain embodiments, the scheduled entity may record and calculate an average path loss experienced over the sidelink communication channel over a specified time frame ($T_w$). For example, the scheduled entity may determine a reference signal received power (RSRP) or a reference signal received quality (RSRQ) of a sidelink communication channel between the scheduled entity and the other scheduled entity. The reference signal received power may be power of the reference signals spread over the full bandwidth and a narrow band. Similarly, the reference signal received quality may be the quality of the reference signal spread over the full bandwidth and a narrow band. The scheduled entity may also receive sidelink control information (SCI), for example, carried by a Physical Sidelink Control Channel (PSCCH), from and decoded by one or more nearby other scheduled entities including the other scheduled entity. In some examples, the scheduled entity may also record a path loss experienced over an uplink communication channel between the scheduled entity and the scheduling entity.

After recording the path loss experienced over the sidelink communication channel and after receiving the sidelink control information (SCI) from the other scheduled entity, the scheduled entity may report to the scheduling entity the sidelink quality of the sidelink communication channel. The sidelink quality may be determined using the path loss (e.g., an average path loss over a period of time (Tw)) recorded by the scheduled entity over the sidelink communication channel. Concurrently (such as through the same transmission used for reporting sidelink quality), or subsequently (such as through another transmission), the scheduled entity may report to the scheduling entity the uplink path loss of the uplink communication channel between the scheduled entity and the scheduling entity. The scheduled entity may also report to the scheduled entity the sidelink control information received from the other scheduled entity.

After (e.g., in response to) receiving the sidelink quality report, the uplink path loss report, and, the sidelink control information report from the scheduled entity, the scheduling entity may select an uplink modulation index for receiving an uplink message from the scheduled entity. For example, the base station may select an uplink modulation index for receiving an uplink message from the first UE based on at least one of the sidelink quality report or the uplink path loss report. The uplink modulation index may be an uplink modulation index previously provided to the scheduled entity (for example, through an RRC signal previously sent to the scheduled entity) along with a correlating (e.g., mapped) sidelink modulation indices so that the scheduled entity and the scheduling entity know and use the same uplink modulation index and an identifiable correlating (e.g., mapped) sidelink modulation index for an uplink message and a sidelink message, respectively.

After the scheduling entity selects an uplink modulation index, the scheduling entity may transmit to the scheduled entity the selected uplink modulation index. In some embodiments, when the scheduling entity transmits the selected uplink modulation index, the scheduling entity may also transmit updated mapping information for dynamic uplink modulation index and sidelink modulation index mapping. Otherwise, the scheduled entity may utilize mapping information previously received from the scheduling entity (e.g., during a previously provided RRC transmission). The selected one or more uplink modulation indices may be transmitted to the scheduled entity through a downlink control information (DCI) transmission.

At block 1304, the scheduling entity may receive, from the scheduled entity, a broadcast transmission comprising a sidelink message, the uplink message, and sidelink control information associated with the sidelink message. For example, after the scheduled entity receives an uplink modulation index from the scheduling entity, the scheduled entity may map the received uplink modulation index to a sidelink modulation index and select that sidelink modulation index for encoding of a sidelink message based on the mapping. The scheduling entity may have previously provided mapping information that maps a received uplink modulation index to one or more specific sidelink modulation indices.

As such, the scheduled entity, upon receiving an uplink modulation index from the scheduled entity, may map the received uplink modulation index to the one or more particular sidelink modulation indices and select one sidelink modulation indices from the one or more particular sidelink modulation index based on the mapping. As another example, the scheduling entity may provide with the transmission of the uplink modulation index or may have previously provided mapping information that maps each of a plurality of uplink modulation indices to one or more sidelink modulation indices as shown in Table 500 of FIG. 5. The scheduled entity, upon receiving an uplink modulation index from the scheduling entity, may map the received uplink modulation index to the one or more particular sidelink modulation indices indicated in the Table 500 and select one sidelink modulation indices from the one or more particular sidelink modulation index based on the mapping.

The scheduled entity may encode the uplink message according to the received uplink modulation index and may encode the sidelink message according to the selected sidelink modulation index. The scheduled entity may superposition code the encoded uplink message and the encode sidelink message into a transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission. The scheduled entity may transmit the broadcast transmission including the uplink message superposition coded with the sidelink message so that both the scheduling entity and the other scheduled entity receive the broadcast transmission and both messages.

At block 1306, the scheduling entity identifies a sidelink modulation index of the sidelink message by decoding the sidelink control information. And, at bock 1308, the scheduling entity may decode the uplink message. The scheduling entity may decode the uplink message based on decoding the sidelink message. Additionally, or alternatively, the scheduling entity may decode the uplink message based on mapping the sidelink modulation index to the uplink modulation index. In certain embodiments, the scheduling entity may decode the uplink message by decoding the uplink modulation index.

For example, the scheduling entity may receive the broadcast transmission including the uplink message superposition coded with the sidelink message. The scheduling may decode the previously received sidelink control information to determine which of the sidelink modulation indices were used to encode the sidelink message. In certain embodiments, the scheduling entity may have previously indicated that MCS-2 from the Table 500 of FIG. 5, and the uplink modulation index $a_2$ be used by the scheduled entity for encoding the uplink message. MCS-2 may map the uplink modulation index $a_2$ to both sidelink modulation indices $b_2$ and $c_2$. The scheduled entity may have selected sidelink modulation index $b_2$ of $b_2$ and $c_2$ as the sidelink modulation index used for encoding the sidelink message. Subsequently, the scheduling entity may decode the sidelink control information received from the scheduled entity to determine that $b_2$ of $b_2$ and $c_2$ is used to encode the sidelink message. Once the scheduling entity decodes the sidelink message from the broadcast transmission, the scheduling entity may decode the uplink message from the broadcast transmission using the uplink modulation index $a_2$ mapped to $b_2$. In some embodiments, the scheduling entity may disregard the sidelink message after decoding it.

In some embodiments, the other scheduled entity may receive the broadcast transmission and may decode the encoded sidelink message using, for example, the sidelink control information previously provided from the other scheduled entity to the scheduled entity. In an embodiment, the other schedule entity may be unable to decode the uplink message because the other scheduled entity may not have the uplink modulation index provided by the scheduling entity and used to decode the uplink message.

Figure 14:
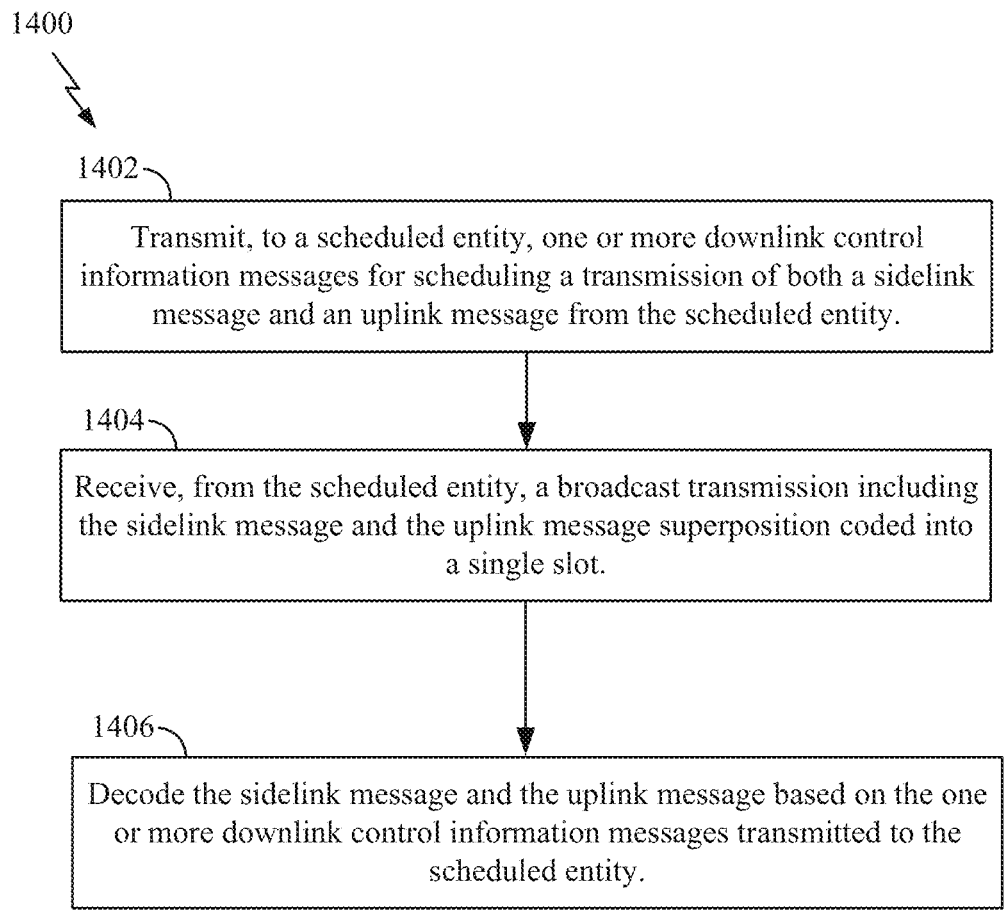
FIG. 14 is another flow chart illustrating an example method operational at a scheduling entity for superposition coding and transmission of a sidelink message and an uplink message.

FIG. 14 is a flow chart illustrating an example method 1400 operational at a scheduling entity, for example, a base station for superposition coding and transmission of a sidelink message and an uplink message. The method 1400 may implement superposition coding and transmission of a sidelink message and an uplink message using downlink control information messages. In some examples, the method 1400 may be carried out by any suitable apparatus or means for carrying out the functions or algorithm described herein.

At block 1402, a scheduling entity (e.g., a base station, a radio access network (RAN) entity) may transmit, to a scheduled entity (e.g., a UE) one or more downlink control information messages for scheduling a transmission of both a sidelink message and an uplink message from the scheduled entity. For example, the scheduled entity may wish to send an uplink message to the scheduling entity and a sidelink message to another scheduled entity. The scheduling entity may transmit one or more downlink control information (DCI) messages to the scheduled entity. In Release 14 and 16, a scheduled entity may send two downlink control information messages: a first downlink control information message for scheduling an uplink message and a second downlink control information message for scheduling a sidelink message. Both the first and second downlink control information messages follow a same timeline to ensure that the uplink message and the sidelink message and transmitted in different slots. For example, when the first and second downlink control information message are transmitted in slot n within the same time, the first downlink control information message will schedule the uplink message for transmission in slot $(n+T_1)$ and the second downlink control information message will schedule the sidelink message for transmission in slot $(n+T_2)$ where $T_1$ and $T_2$ are different times so that the uplink message and the sidelink message are transmitted in different slots on the same time line.

In some examples, when the scheduled entity receives, from the scheduling entity, the one or more downlink control information messages, the scheduled entity may receive the one downlink control information message in a slot n. For example, the scheduled entity may transmit only one downlink control information message to the scheduled entity. The solitary or single downlink control information message may be used for scheduling both the uplink message and the sidelink message. When the solitary downlink control information message is transmitted in slot n, both the uplink message and the sidelink message may be scheduled for transmission in slot (n+T).

After the scheduled entity receives the solitary downlink control information message from the scheduling entity, the scheduled entity may superposition code an uplink message with a sidelink message into a broadcast transmission for concurrent transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission. Because the solitary downlink control information message schedules both the uplink message and the sidelink message for transmission in slot (n+T), the first UE superposition codes the uplink message and the sidelink message in a same slot (n+T) or an overlapping slot (e.g., such that one slot is a subset of the other).

In some embodiments, when the scheduled entity receives, from the scheduling entity, the one or more downlink control information messages, the scheduled entity may receive the first downlink control information message at a slot n and the second downlink control information message at a slot (n+1). In some embodiments, the single slot of the broadcast transmission (e.g., a broadcast message) is another slot (n+5) identified in both the first downlink control information message and the second downlink control information message. In some embodiment, the one or more downlink control information messages may include a first downlink control information message for scheduling a transmission of the sidelink message in a first timeline and a second downlink control information message for scheduling a transmission of the uplink message in a second timeline.

As an example, the scheduling entity may transmit only one downlink control information message to the schedule entity. The solitary or single downlink control information message may be used for scheduling both the uplink message and the sidelink message. For example, when the solitary downlink control information message is transmitted in slot n, both the uplink message and the sidelink message may be scheduled for transmission in slot (n+T).

After the scheduled entity receives the solitary downlink control information message from the scheduling entity, the scheduled entity may superposition code an uplink message with a sidelink message into a broadcast transmission for concurrent transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission. Because the solitary downlink control information message schedules both the uplink message and the sidelink message for transmission in slot (n+T), the scheduled entity superposition codes the uplink message and the sidelink message in a same slot (n+T) or an overlapping slot (e.g., such that one slot is a subset of the other).

At block 1404, the scheduling entity may receive, from the scheduled entity, a broadcast transmission including the sidelink message and the uplink message superposition coded (by the scheduled entity) into a single slot. And, at block 1406, the scheduling entity may decode the sidelink message and the uplink message based on the one or more downlink control information messages transmitted to the scheduled entity. For example, the scheduled entity may transmit the broadcast transmission including the uplink message superposition coded with the sidelink message so that both the scheduling entity and the other scheduled entity receive the broadcast transmission and both messages. The scheduling entity may receive the broadcast transmission including the uplink message superposition coded with the sidelink message. The scheduling entity may decode the sidelink message and the uplink message from the broadcast transmission. For example, after decoding the sidelink message, the scheduling entity may disregard the sidelink message. After disregarding the sidelink message, the scheduling entity may decode the uplink message from the broadcast transmission based on the timing provided by the scheduling entity for the uplink message.

The other scheduled entity may receive the broadcast transmission and may decode the encoded sidelink message. In an embodiment, the other scheduled entity may be unable to decode the uplink message because the other scheduled entity may not have the timing provided by the scheduling entity for the uplink message.

Figure 15:
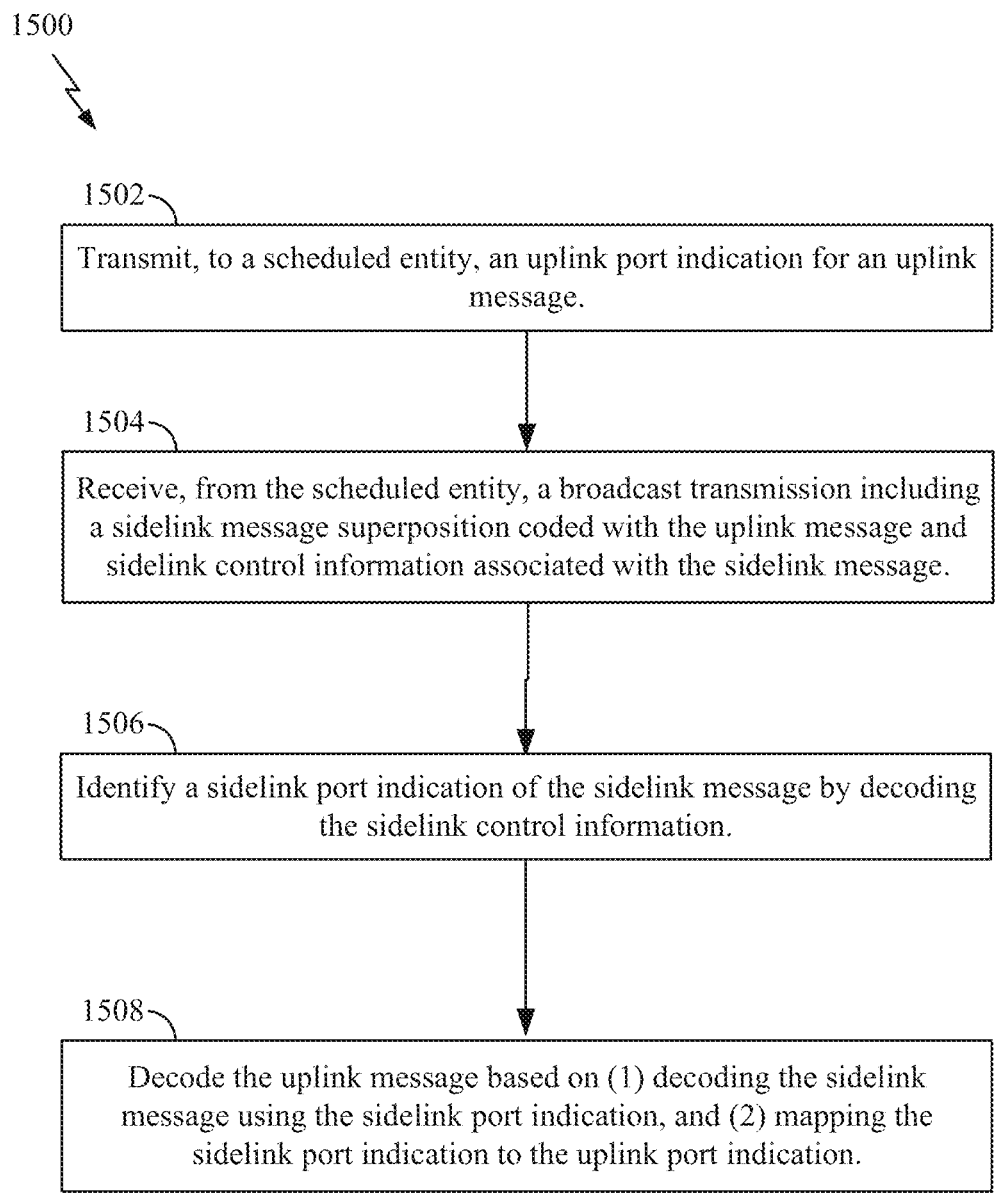
FIG. 15 is yet another flow chart illustrating an example method operational at a scheduling entity for superposition coding and transmission of a sidelink message and an uplink message.

FIG. 15 is a flow chart illustrating an example method 1500 operational at a scheduling entity, for example, a base station for superposition coding and transmission of a sidelink message and an uplink message. The method 1500 may implement superposition coding and transmission of a sidelink message and an uplink message using uplink port indicators. In some examples, the method 1500 may be carried out by any suitable apparatus or means for carrying out the functions or algorithm described herein.

At block 1502, the scheduling entity (e.g., a base station, a radio access network (RAN) entity) may transmit, to a scheduled entity (e.g., a UE), an uplink port identification for an uplink message. For example, the scheduled entity may receive radio resource control (RRC) broadcast signals broadcast from the scheduling entity. The radio resource control broadcast signals may include one or more port indications for uplink communications and a correlated (e.g., mapped) one or more port indications for sidelink communications. For example, during or after the setup between the scheduled entity and the scheduling entity, the scheduling entity may transmit (e.g., broadcast) a radio resource control signal to the scheduled entity. The radio resource control signal may include a port indication for an uplink communication and a corresponding (e.g., a mapped) port indication for a sidelink communication. As described herein, because the scheduling entity knows the one or more uplink port identifications and the corresponding one or more sidelink port identifications (having sent them to the scheduled entity), when the scheduling entity receives a broadcast transmission from the scheduled entity containing an uplink message superposition coded with a sidelink message associated with the uplink port identification and a sidelink message associated with the sidelink port identification, the scheduling entity may decode the sidelink message (which may be ignored or disregarded by the scheduling entity) based on the sidelink port identification and may decode the uplink message based on the corresponding uplink port identification.

In some cases, when there is only one uplink port identification, the one uplink port identification may correspond to only one sidelink port identification. In some cases, when there are two or more uplink port identifications, the two or more uplink port identifications may correspond to only two sidelink port identifications.

The scheduled entity may wish to send an uplink message to the scheduling entity and a sidelink message to another scheduled entity. The scheduled entity may record a path loss experienced over a sidelink communication channel between the scheduled entity and the other scheduled entity. The scheduled entity may use the recorded path loss experienced over the sidelink communication channel to report a sidelink quality to the scheduling entity.

In certain embodiments, the scheduled entity may record and calculate an average path loss experienced over the sidelink communication channel between the over a specified time frame ($T_w$). For example, the scheduled entity may determine a reference signal received power (RSRP) or a reference signal received quality (RSRQ) of a sidelink communication channel. The reference signal received power may be power of the reference signals spread over the full bandwidth and a narrow band. Similarly, the reference signal received quality may be the quality of the reference signal spread over the full bandwidth and a narrow band. The scheduled entity may also receive sidelink control information (SCI), for example, carried by a Physical Sidelink Control Channel (PSCCH), from and decoded by one or more nearby scheduled entities including the other scheduled entity. In some examples, the scheduled entity may also record a path loss experienced over an uplink communication channel between the scheduled entity and the scheduling entity.

After recording the path loss experienced over the sidelink communication channel and after receiving the sidelink control information (SCI) from the other scheduled entity, the scheduled entity may report to the scheduling entity the sidelink quality of the sidelink communication channel between the scheduled entity and the scheduling entity. The sidelink quality may be determined using the path loss (e.g., an average path loss over a period of time (Tw)) recorded by the scheduled entity over the sidelink communication channel. Concurrently (such as through the same transmission used for reporting sidelink quality), or subsequently (such as through another transmission), the scheduled entity may report to the scheduling entity the uplink path loss of the uplink communication channel between the scheduled entity and the scheduling entity. The scheduled entity may also report to the scheduling entity the sidelink control information received from the other scheduled entity.

After (e.g., in response to) receiving the sidelink quality report, the uplink path loss report, and, the sidelink control information report from the scheduled entity, the scheduling entity may select an uplink port identification for receiving an uplink message from the scheduled entity. For example, the base station may select an uplink modulation index for receiving an uplink message from the first UE based on at least one of the sidelink quality report or the uplink path loss report. The uplink port identification may be an uplink port identification previously provided to the scheduled entity (for example, through an RRC signal previously sent the scheduled entity) along with a correlating (e.g., mapped) sidelink port identification so that the scheduled entity and the scheduling entity know and use the same uplink port identification and an identifiable correlating (e.g., mapped) sidelink port identification for an uplink message and a sidelink message, respectively.

After the scheduling entity selects an uplink port identification, the scheduling entity may transmit to the first UE the selected uplink port identification. In some embodiments, when the scheduling entity transmits the selected uplink port identification, the scheduling entity may also transmit updated mapping information for dynamic uplink port identification and sidelink port identification mapping. Otherwise, the scheduled entity may utilize mapping information previously received from the scheduling entity (e.g., during a previously provided RRC transmission). The selected one or more uplink port identifications may be transmitted to the scheduled entity through a downlink control information (DCI) transmission.

At block 1504, the scheduling entity may receive, from the scheduled entity, a broadcast transmission including a sidelink message superposition coded with the uplink message and sidelink control information associated with the sidelink message. For example, after the scheduled entity receives an uplink port identification from the scheduling entity, the scheduled entity may map the received uplink port identification to a sidelink port identification and select that sidelink port identification for association with a sidelink message based on the mapping. For example, the scheduling entity may have previously provided mapping information that maps a single received uplink port identification to one single sidelink port identification. As such, the scheduled entity, upon receiving an uplink port identification from the scheduling entity, may map the received uplink port identification to the one sidelink port identification and may select the one sidelink port identification based on the mapping. As another example, the scheduling entity may have previously providing mapping information that maps a received uplink port identification of two or more uplink port identifications to two sidelink port identifications. As such, the scheduled entity, upon receiving an uplink port identification of the two or more uplink port identifications from the scheduling entity, may map the received uplink port identification to the one of two sidelink port identification and may select the one sidelink port identification based on the mapping.

For example, the scheduled entity may associate the uplink message with the received uplink port identification and may associate the sidelink message with the selected sidelink port identification. The scheduled entity may superposition code the uplink message and the sidelink message into a transmission. Superposition coding may include superimposing one or more messages on top of another one or more messages in a transmission (e.g., a broadcast transmission). Superposition coding may be used to allow a transmitter to simultaneously send independent packets or messages to multiple receivers using a single broadcast transmission. The scheduled entity may transmit the broadcast transmission including the uplink message superposition coded with the sidelink message so that both the scheduling entity and the other scheduled entity receive the broadcast transmission and both messages. The scheduling entity may receive the broadcast transmission including the uplink message superposition coded with the sidelink message.

At block 1506, the scheduling entity may identify a sidelink port identification of the sidelink message by decoding the sidelink control information. And, at block 1508, the scheduling entity may decode the uplink message based on (1) decoding the sidelink message using the sidelink port identification, and (2) mapping the sidelink port identification to the uplink port identification. For example, after the scheduling entity receive the broadcast transmission including the uplink message superposition coded with the sidelink message, the scheduling entity may decode the previously received sidelink control information to determine which of the sidelink port identifications were associated with the sidelink message. Subsequently, the scheduling entity may decode the sidelink control information received from the scheduled entity to determine which sidelink port identification is associated with the sidelink message. Once the scheduled entity decodes the sidelink message from the broadcast transmission, the scheduling entity may decode the uplink message from the broadcast transmission based on the uplink message's association with the uplink port identification mapped to the sidelink port identification. In some embodiments, the scheduling entity may disregard the sidelink message after decoding it.

The other scheduled entity may receive the broadcast transmission and may decode the sidelink message using, for example, the sidelink control information previously provided by the other scheduled entity to the scheduled entity. In an embodiment, the other scheduled entity may be unable to decode the uplink message because the other scheduled entity may not have received the associated uplink port identification from the scheduling entity and used to decode the uplink message.

Several aspects of a wireless communication network have been presented with reference to an exemplary implementation. As those skilled in the art will readily appreciate, various aspects described throughout this disclosure may be extended to other telecommunication systems, network architectures and communication standards.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication at a user equipment (UE), the method comprising:
   receiving, from a radio access network (RAN) entity, one of an uplink indication or an uplink port identification associated with an uplink port, wherein the uplink indication and the uplink port identification are associated with an uplink message;
   mapping one of:
      the uplink indication to a sidelink indication associated with a sidelink message, or
      the uplink port identification to a sidelink port identification associated with a sidelink port and the sidelink message; and
   concurrently transmitting, to the RAN entity, in a same time-frequency resource, the uplink message and the sidelink message as a broadcast transmission based on one of (A) the uplink indication and the sidelink indication, or (B) the uplink port and the sidelink port, wherein:
   the uplink indication comprises an uplink modulation index, and
   the uplink modulation index is based on a sidelink path loss of a sidelink communication channel of the UE and an uplink path loss of an uplink communication channel for communication between the UE and the RAN entity.

2. The method of claim 1, wherein the uplink indication comprises one of (A) the uplink modulation index, or (B) one or more downlink control information messages for scheduling at least one of the uplink message or the sidelink message.

3. The method of claim 1, wherein the uplink indication comprises the uplink modulation index, and the method further comprises:
   transmitting, to the RAN entity, the sidelink path loss of the sidelink communication channel of the UE, and the uplink path loss of the uplink communication channel for enabling the RAN entity to select the uplink modulation index for communication to the UE.

4. The method of claim 1, wherein the sidelink path loss of the sidelink communication channel of the UE is based on a reference signal received power indication of the sidelink communication channel and sidelink control information from one or more other UEs.

5. The method of claim 1, wherein the uplink indication comprises the uplink modulation index, and receiving, from the RAN entity, the uplink modulation index comprises:
   receiving, from the RAN entity, a modulation and control scheme range containing the uplink modulation index; and
   receiving, from the RAN entity, modulation and control scheme mapping information for mapping the uplink modulation index to one or more sidelink modulation indices.

6. The method of claim 2, wherein, the uplink indication comprises the one or more downlink control information messages, and receiving, from the RAN entity, one of the uplink indication or the uplink port identification comprises:
   receiving, from the RAN entity, the one or more downlink control information messages for scheduling a transmission of both the sidelink message and the uplink message to the RAN entity.

7. The method of claim 6, wherein the one or more downlink control information messages comprises one downlink control information message for scheduling the transmission of both the sidelink message and the uplink message in a same timeline.

8. The method of claim 6, wherein the one or more downlink control information messages comprise:
a first downlink control information message for scheduling the transmission of the sidelink message in a first timeline; and
a second downlink control information message for scheduling the transmission of the uplink message in a second timeline.

9. The method of claim 8, wherein:
receiving, from the RAN entity, the one or more downlink control information messages for scheduling the transmission of both the sidelink message and the uplink message to the RAN entity comprises:
receiving the first downlink control information message at a slot n, and
receiving the second downlink control information message at a slot (n+x), wherein x comprises an integer value; and
a single slot of the broadcast transmission is another slot (n+y) identified in both the first downlink control information message and the second downlink control information message, wherein y comprises an integer value.

10. The method of claim 1, wherein:
the uplink port identification comprises two or more uplink port identifications of two or more uplink ports, wherein each uplink port identification of the two or more uplink port identifications is associated with an uplink port of the two or more uplink ports; and
the sidelink port identification comprises only two sidelink port identifications of only two sidelink ports, wherein each sidelink port identification of the only two sidelink ports is associated with one sidelink port of the only two sidelink ports.

11. A user equipment (UE) for wireless communication, the UE comprising:
a transceiver for wirelessly communicating with a radio access network (RAN) entity; and
one or more processors electronically coupled to the transceiver and configured to:
receive, from a radio access network (RAN) entity, one of an uplink indication or an uplink port identification associated with an uplink port, wherein the uplink indication and the uplink port identification are associated with an uplink message,
map one of:
the uplink indication to a sidelink indication associated with a sidelink message, or
the uplink port identification to a sidelink port identification associated with a sidelink port and the sidelink message, and
concurrently transmit, to the RAN entity, in a same time-frequency resource, the uplink message and the sidelink message as a broadcast transmission based on one of (A) the uplink indication and the sidelink indication, or (B) the uplink port and the sidelink port, wherein:
the uplink indication comprises an uplink modulation index, and the uplink modulation index is based on a sidelink path loss of a sidelink communication channel of the UE and an uplink path loss of an uplink communication channel for communication between the UE and the RAN entity.

12. The UE of claim 11, wherein the uplink indication comprises one of (A) the uplink modulation index, or (B) one or more downlink control information messages for scheduling at least one of the uplink message or the sidelink message.

13. The UE of claim 11, wherein the uplink indication comprises the uplink modulation index, and the one or more processors are further configured to:
transmit, to the RAN entity, the sidelink path loss of the sidelink communication channel of the UE, and the uplink path loss of the uplink communication channel for enabling the RAN entity to select the uplink modulation index for communication to the UE.

14. The UE of claim 11, wherein the sidelink path loss of the sidelink communication channel of the UE is based on a reference signal received power indication of the sidelink communication channel and sidelink control information from one or more other UEs.

15. The UE of claim 11, wherein the uplink indication comprises the uplink modulation index, and to receive, from the RAN entity, the uplink modulation index the one or more processors are configured to:
receive, from the RAN entity, a modulation and control scheme range containing the uplink modulation index; and
receive, from the RAN entity, modulation and control scheme mapping information for mapping the uplink modulation index to one or more sidelink modulation indices.

16. The UE of claim 12, wherein, the uplink indication comprises the one or more downlink control information messages, and to receive, from the RAN entity, one of the uplink indication or the uplink port identification, the one or more processors are configured to:
receive, from the RAN entity, the one or more downlink control information messages for scheduling a transmission of both the sidelink message and the uplink message to the RAN entity.

17. The UE of claim 16, wherein the one or more downlink control information messages comprises one downlink control information message for scheduling the transmission of both the sidelink message and the uplink message in a same timeline.

18. The UE of claim 16, wherein the one or more downlink control information messages comprise:
a first downlink control information message for scheduling the transmission of the sidelink message in a first timeline; and
a second downlink control information message for scheduling the transmission of the uplink message in a second timeline.

19. The UE of claim 18, wherein:
to receive, from the RAN entity, the one or more downlink control information messages for scheduling the transmission of both the sidelink message and the uplink message to the RAN entity, the one or more processors are configured to:
receive the first downlink control information message at a slot n, and
receive the second downlink control information message at a slot (n+x), wherein x comprises an integer value; and a single slot of the broadcast transmission is another slot (n+y) identified in both the first downlink control information message and the second downlink control information message, wherein y comprises an integer value.

20. The UE of claim 11, wherein:
the uplink port identification comprises two or more uplink port identifications of two or more uplink ports, wherein each uplink port identification of the two or more uplink port identifications is associated with an uplink port of the two or more uplink ports; and
the sidelink port identification comprises only two sidelink port identifications of only two sidelink ports, wherein each sidelink port identification of the only two sidelink ports is associated with one sidelink port of the only two sidelink ports.

21. The method of claim 1, wherein the same time-frequency resource is at least one resource element.

22. The user equipment of claim 11, wherein the same time-frequency resource is at least one resource element.

23. A method of wireless communication at a radio access network (RAN) entity, the method comprising:
transmitting, to a user equipment (UE), one of an uplink indication or an uplink port identification associated with an uplink port, wherein the uplink indication and the uplink port identification are associated with an uplink message;
receiving, from the UE, a broadcast transmission comprising a sidelink message, the uplink message, and sidelink control information associated with the sidelink message, wherein the sidelink message and the uplink message are contained in the broadcast transmission in a same time-frequency resource;
identifying one of a sidelink indication or a sidelink port identification by decoding the sidelink control information, wherein the sidelink indication and the sidelink port identification are associated with the sidelink message, and wherein the sidelink indication is mapped to the uplink indication and the sidelink port identification is mapped to the uplink port identification; and
decoding the uplink message based on (A) decoding the sidelink message using a sidelink modulation index, and (B) mapping one of the sidelink indication to the uplink indication or the sidelink port identification to the uplink port identification.

24. The method of claim 23, wherein the uplink indication comprises one of (A) an uplink modulation index, or (B) one or more downlink control information messages for scheduling at least one of the uplink message or the sidelink message.

25. The method of claim 24, wherein the uplink indication comprises the uplink modulation index, and transmitting, to the UE, the uplink modulation index comprises:
transmitting, to the UE, a modulation and control scheme range containing the uplink modulation index; and
transmitting, to the UE, modulation and control scheme mapping information for mapping the uplink modulation index to the sidelink modulation index associated with the sidelink message.

26. The method of claim 25, wherein the modulation and control scheme range and the modulation and control scheme mapping information are based on a path loss of a sidelink communication channel associated with the UE.

27. A radio access network (RAN) entity for wireless communication, the RAN entity comprising:
a transceiver for wirelessly communicating with a user equipment (UE); and
one or more processors electronically coupled to the transceiver and configured to:
transmit, to the UE, one of an uplink indication or an uplink port identification associated with an uplink port, wherein the uplink indication and the uplink port identification are associated with an uplink message,
receive, from the UE, a broadcast transmission comprising a sidelink message, the uplink message, and sidelink control information associated with the sidelink message, wherein the sidelink message and the uplink message are contained in the broadcast transmission in a same time-frequency resource,
identify one of a sidelink indication or a sidelink port identification by decoding the sidelink control information, wherein the sidelink indication and the sidelink port identification are associated with the sidelink message, and wherein the sidelink indication is mapped to the uplink indication and the sidelink port identification is mapped to the uplink port identification, and
decode the uplink message based on (A) decoding the sidelink message using a sidelink modulation index, and (B) mapping one of the sidelink indication to the uplink indication or the sidelink port identification to the uplink port identification.

28. The RAN entity of claim 27, wherein the uplink indication comprises one of (1) an uplink modulation index, or (2) one or more downlink control information messages for scheduling at least one of the uplink message or the sidelink message.

29. The RAN of claim 28, wherein the uplink indication comprises the uplink modulation index, and to transmit, to the UE, the uplink indication, the one or more processors are configured to:
transmit, to the UE, a modulation and control scheme range containing the uplink modulation index; and
transmit, to the UE, modulation and control scheme mapping information for mapping the uplink modulation index to the sidelink modulation index associated with the sidelink message.

30. The RAN of claim 29, wherein the modulation and control scheme range and the modulation and control scheme mapping information are based on a path loss of a sidelink communication channel associated with the UE.

* * * * *